US010730649B2

(12) United States Patent
Irwin et al.

(10) Patent No.: US 10,730,649 B2
(45) Date of Patent: Aug. 4, 2020

(54) SERVO DRIVEN ICE CREAM SANDWICH ASSEMBLY AND WRAPPING MACHINE

(71) Applicant: Norse Dairy Systems, LLC, Columbus, OH (US)

(72) Inventors: Jeff Irwin, Etna, OH (US); Jeff Crawford, Canal Winchester, OH (US)

(*) Notice: Subject to any disclaimer, the term of this patent is extended or adjusted under 35 U.S.C. 154(b) by 724 days.

(21) Appl. No.: 15/355,619

(22) Filed: Nov. 18, 2016

(65) Prior Publication Data
US 2017/0137157 A1 May 18, 2017

Related U.S. Application Data

(60) Provisional application No. 62/256,783, filed on Nov. 18, 2015.

(51) Int. Cl.
*B65B 11/02* (2006.01)
*B65B 11/08* (2006.01)
(Continued)

(52) U.S. Cl.
CPC .............. *B65B 11/02* (2013.01); *A23G 9/24* (2013.01); *A23G 9/286* (2013.01); *B65B 11/08* (2013.01);
(Continued)

(58) Field of Classification Search
CPC .......... A23G 9/24; A23G 9/286; B65B 11/02; B65B 11/08; B65B 25/007; B65B 35/20; B65B 41/12; B65B 51/10; B65B 57/00; B65B 59/00; B65B 65/02; B65B 5/06; B65B 5/106; B65B 35/32; B65B 35/40;
(Continued)

(56) References Cited

U.S. PATENT DOCUMENTS 2,794,404 A * 6/1957 Rapp ...................... A23G 9/286
425/114
3,316,860 A * 5/1967 Peterson ................ A23G 9/286
425/308
(Continued)

OTHER PUBLICATIONS

Packing Digest Staff, Tutorial: Servo Systems, pp. 1-7, Jul. 31, 2003, Automation, http://www.packagingdigest.com/automation/tutorial-servo-systems.
(Continued)

*Primary Examiner* — Dana Ross
*Assistant Examiner* — Joseph W Iskra
(74) *Attorney, Agent, or Firm* — Tyler B. Droste; Gutwein Law

(57) ABSTRACT

An apparatus for the preparation of comestible-containing sandwich products comprises a sandwich product assembly station and corresponding means for the fabrication and assembly of a sandwich product in the vertical direction. The apparatus includes an extruder nozzle, wafer trays and corresponding components for the location of wafers on opposite sides of the extruded product, an indexing wheel for receiving the assembled sandwich product, and conveying means for conveying to a wrapping assembly and from there to a discharge end, wherein all of the components of the apparatus are mounted in cantilevered fashion on a vertical support or base member. Each element is powered individually by a servo motor and controlled by a controller allowing the variability of throughput for each station.

19 Claims, 20 Drawing Sheets

(51) Int. Cl.
    *B65B 59/00*         (2006.01)
    *A23G 9/28*         (2006.01)
    *A23G 9/24*         (2006.01)
    *B65B 25/00*         (2006.01)
    *B65B 35/20*         (2006.01)
    *B65B 41/12*         (2006.01)
    *B65B 51/10*         (2006.01)
    *B65B 57/00*         (2006.01)
    *B65B 65/02*         (2006.01)

(52) U.S. Cl.
    CPC ............ *B65B 25/007* (2013.01); *B65B 35/20* (2013.01); *B65B 41/12* (2013.01); *B65B 51/10* (2013.01); *B65B 57/00* (2013.01); *B65B 59/00* (2013.01); *B65B 65/02* (2013.01)

(58) Field of Classification Search
    CPC ..... B65B 35/5057; B65B 57/14; B65B 57/20; B65B 65/003; B65B 65/08; B65B 2210/00; B65B 59/005; B65G 47/26; B65G 47/32; B65G 47/74; B65G 47/94
    USPC ........ 198/430, 468.1, 746, 369.3; 53/52, 54, 53/540, 251, 252, 500
    See application file for complete search history.

(56) References Cited

U.S. PATENT DOCUMENTS

| | | | | |
|---|---|---|---|---|
| 3,828,660 | A * | 8/1974 | Mueller | A23G 9/286 |
| | | | | 53/550 |
| 3,834,119 | A * | 9/1974 | Armitt | A23G 9/286 |
| | | | | 53/230 |
| 4,580,476 | A * | 4/1986 | Jones | A23G 9/245 |
| | | | | 83/160 |
| 4,628,664 | A * | 12/1986 | Price | B65B 25/007 |
| | | | | 53/223 |
| 5,127,449 | A | 7/1992 | Mueller et al. | |
| 5,419,099 | A | 5/1995 | Mueller et al. | |
| 5,493,957 | A * | 2/1996 | Kennedy | A23G 9/285 |
| | | | | 99/450.4 |
| 7,267,075 | B2 | 9/2007 | McKay | |
| 7,322,166 | B1 * | 1/2008 | Claxton | A21C 15/02 |
| | | | | 53/230 |
| 10,071,831 | B1 * | 9/2018 | Spencer | B65B 59/005 |
| 2008/0095896 | A1 | 4/2008 | Mueller et al. | |
| 2013/0067858 | A1 * | 3/2013 | Spears | B65B 3/10 |
| | | | | 53/122 |

OTHER PUBLICATIONS

Servomotor Information, pp. 1-14, 2007, Blue Point Engineering, http://www.bpesolutions.com/bpemanuals/Servo.Info.pdf.

Packaging Equipment Showcase, pp. 1-13, Jul. 9, 2007, http://www.dairyfoods.com/articles/83097-packaging-equipment-showcase.

M. Whiting, BSc(Hons), PhD and N.P. Cottell, CEng, MIMechE, Programmable Servo Control—A New Approach, pp. 1-8, Jun. 22, 1994, http://www.servovalve.com/technical/imech3.pdf.

Servo-driven features of Evergreen gable-top machine provide flexibility, pp. 1-12, Apr. 25, 2010, http://www.dairyfoods.com/articles/85373-servo-drivenfeatures-of-evergreen-gable-top-machine-provide-flexibility.

Advances in Servo Motors and Motor Drive Technologies (Technical Insights), p. 1, Jun. 24, 2005, Frost & Sullivan, http://www.frost.com/sublib/frost-content.do?sheetName=report-overview&sheetGroup=D350-01-00-00-00&viewName=virtual-brochure&repid=D350-01-00-00-00.

\* cited by examiner

SERVO DRIVEN ICE CREAM SANDWICH ASSEMBLY AND WRAPPING MACHINE

CROSS-REFERENCE TO RELATED APPLICATION

This U.S. Patent Application claims priority to U.S. Provisional Application 62/256,783 filed Nov. 18, 2015, the disclosure of which is considered part of the disclosure of this application and is hereby incorporated by reference in its entirety.

FIELD OF THE INVENTION

This invention relates generally to an apparatus for making comestible-containing sandwich products such as ice cream sandwiches and wrapping of comestible-containing sandwich products.

BACKGROUND

There have been many machines known in the art for the manufacture and wrapping of ice cream sandwiches, the basic features of which are well understood by those of ordinary skill in the art. Examples of such prior art devices include those disclosed in U.S. Pat. No. 3,828,660 to Mueller et al., U.S. Pat. No. 3,834,119 to Armitt et al., U.S. Pat. No. 4,628,664 to Price et al. and U.S. Pat. No. 5,493,957 to Kennedy et al., which are incorporated herein by reference.

As shown in these patents and as is well known in the art, an ice-cream sandwich filling apparatus typically comprises an apparatus frame to which a series of stations are affixed in a cantilevered fashion. The moving components of the apparatus are typically controlled by a numerical or computer controller through one or more drive mechanisms. The first station is typically the wafer filling station, in which a top and bottom wafer are provided by wafer feeders and an ice-cream extruder discharges ice cream between the wafers. The completed sandwich is then delivered, often via an indexing wheel or similar device, to a conveyor assembly, also affixed to the apparatus frame, which carries the sandwich toward a wrapping station.

When the sandwich arrives at the wrapping station, it first enters at the bottom of a vertical elevator, where a cut sheet of wrapping paper, provided by primary and secondary paper rollers and cut by a rotary knife between the two rollers, is situated atop the sandwich. The paper rollers are typically biased downward through the use of mechanical compression springs to provide friction between the roller and the supplied paper, thereby reducing or preventing slippage. The operation of the paper rollers and rotary knife and the arrangement of the cut sheet atop the sandwich is known in the prior art, and typically all of these parts have been commonly driven. The elevator then carries the sandwich and cut sheet upwards through the wrapping assembly, where a pusher mechanism cooperates with side and bottom tucking devices both to fold the paper about the sandwich and to push the wrapped sandwich toward an exit tray. The operation of these tuckers is also known in the art. The exit tray in turn includes one or more heated platens, which act to heat seal the bottom overlaps of the cut sheet of wrapping paper to each other, providing a secure wrap.

Despite the periodic improvements reflected in the above-referenced patents, there remain several drawbacks in ice cream sandwich-making machines known in the art, particularly with respect to the single motor drivetrain apparatus. For example, current ice cream sandwich making machines use a combination of AC motor and gearbox to drive the components of the machine through a series of belts, chains, cams, gearboxes and shafts. This type of drive arrangement is subject to mechanical failure and continuous maintenance. Further, the components of this type of mechanical drive take up substantially more internal space within the machine, congest, interfere, and make difficult the maintenance, repair, and/or replacements of parts or components of the ice cream sandwich making apparatus.

In addition, the relative motions and timing of components and stations are normally fixed in current machines, unless the machine is manually adjusted or an existing mechanical setting is changed—typically requiring substantial down time for the machine. Even further, many complex processes, for example motions, phasing and/or timing of components and stations are not achievable with this type of conventional drive arrangement due to limitations of mechanical factors. Therefore, there is a need for an apparatus to provide the same consistency of manufacturing while providing additional adjustments for throughput and maintenance.

BRIEF SUMMARY OF THE INVENTION

In one aspect, the present invention relates to an improved apparatus for the assembly of comestible-containing sandwich products such as ice cream sandwiches and wrapping of comestible-containing sandwich products. The apparatus disclosed is constructed about a vertical support or wall having attached thereto in cantilevered fashion a sandwich assembling station.

A sandwich assembling station comprising a central extruder with a nozzle for the discharge of a comestible of a predetermined shape and a sandwich wafer dispensing means comprising inclined wafer trays configured to stably support a plurality of wafers for delivery against the corresponding opposite ends of the extruded comestible product. The sandwich assembling station further comprised of an indexing means comprising an indexing wheel that is disposed vertically below the sandwich assembling means, the indexing means comprising an indexing wheel defining a plurality of circumferentially positioned pockets or slots for receiving and transferring sandwiches for horizontal conveyance.

A conveyor assembly station communicates with the indexing means for receiving ice cream sandwiches from the discharge end thereof and conveying them horizontally for wrapping, where the conveyor assembly station comprising movable conveyor means for receiving and urging said ice cream sandwiches forward, a plurality of lugs projecting from the conveyor means configured to cooperate with the indexing wheel and to engage and urge sandwiches out of the pockets, and conveyor track means disposed medially of the conveyor means, the conveyor track means comprising a fixed conveyor track having a receiving end spaced from the indexing wheel, and an adjustable conveyor track slidably movable with respect to the fixed conveyor track.

A sandwich wrapping assembly is located at the discharge end of the conveyor, the wrapping assembly comprising a vertically reciprocable elevator for receiving the sandwich and a sheet of wrapping material and conveying the sandwich and the wrapping material to a tucking mechanism. The tucking mechanism is comprised of two laterally disposed and reciprocable side tucking fingers for urging said wrapping paper about the opposite ends of said sandwich, and a bottom tucking device reciprocable in a direction 90° removed from the side tucking device, and co-acting therewith to complete the wrapping of the ice cream sandwich.

The invention extends in a first aspect to the modular construction of the described apparatus, in that the sandwich assembling station, sandwich indexing means and the sandwich wrapping means are all removable from the apparatus and replaceable with corresponding components of different size to accommodate the manufacture of differently sized sandwich products. Thus, the wafer trays, extruder nozzles, indexing wheel, elevator, side tuck fingers and bottom tuck device may all be removed and replaced with like components of different dimension.

Another aspect of the invention relates to improvements of the drivetrain of the apparatus by supplying each individual station with a servo motor or multiple servo motors to drive each respected station in communication with each other. The apparatus described above comprising a plurality of servo motors drives for driving the various stations and components within each station, of the apparatus. The servo motors may be communicatively coupled to and coordinated by a controller such as a programmable logic controller ("PLC") that provides a variety of custom and/or complex controls. Increasing the number of servo motors and the manner of the application of the servo motors provides increased control of each station and component within the station of the apparatus, allowing a user to optimize the functionality of the apparatus based on variables in sizes of sandwich products. The additional functionality provided by the servo motors can provide higher production rates, easier repair, and adjustability of timing requirements for the apparatus throughput requirements.

The drivetrain of the apparatus is less complex and there is less congested by eliminating the multiple chains, belts, and gears necessary to properly coordinate the interaction between the stations and components therein. The less congestion allows for easier access for repair, replacement, and modularity of the parts cantilevered to the wall. The servos also prevent the need to re-gear the drivetrain mechanism to conform to the type and size of sandwich being produced and can easily be adjusted using the PLC to control the speed of the individual servo motors. The timing and coordination of the various servo motors are capable of being performed rapidly through the PLC that can be connected to an electronic interface, such as a graphical user interface, thus allowing a user to manual control or load a pre-set program to be performed by the PLC.

A further aspect of the present invention relates to the adjustability of the conveyor means. Specifically, the portion of the conveyor means that is outboard of the vertical support of the apparatus, is reciprocable and may thereby be adjusted in the horizontal plane either inward or outward from the inboard portion of said conveyor means and the vertical support wall, to accommodate corresponding differences in the size of the sandwich product being manufactured and conveyed. The servo driven conveyor means is mounted on shafts with slots journaled therein, and corresponding dogs are pivotable into and out of engagement with said slots to secure the corresponding chain sprockets in particular positions therealong. Also, the portion of the conveyor adjacent to said indexing wheel is secured by a pivoting support arm that is releasably engageable and when released, pivots into the vertically downward position to draw said conveyor and sprocket out of the way of said indexing wheel to permit the removal of the latter from its drive shaft, for corresponding replacement.

The apparatus further includes wrapping material dispensing means, including a plurality of wrapping material dispenser spools that are servo driven indexed and timed for delivery of said wrapping paper and the severing of same to a predetermined size for the respective sandwich being wrapped. The means for indexing and severing wrapping paper of a predetermined size is driven by a servo motor, which can be adjusted by the PLC to accommodate various sizes and frequency of the wrapping material being severed and provided.

The present apparatus may thereby be easily converted to accommodate the need for the production of ice cream sandwiches of different size, simply by the removal and replacement of the key elements of the sandwich fabricating process, as described above. The ability for the PLC to have pre-determined programs for various sized sandwiches, and thus, powering the individual servo motors accordingly eliminates the need to retime the apparatus using different sprockets required by a typical chain driven apparatus. Thus, the extruder, the wafer trays, the indexing wheel, the sandwich elevator and the support for the side tucking devices and bottom tucking devices may all be easily removed and replaced with corresponding elements of different size. Likewise, the conveyors may be adjusted as indicated above by the slidable movement and locking down of the respective guard rails and conveyor sprockets. More generally, the disposition of the entire apparatus in cantilevered fashion, extending from the single vertical support wall, and use of servo motors facilitates both the ease of retrofitting as described, and likewise renders the entire apparatus more accessible for rapid cleaning in use.

Accordingly, it is a principal object of the present invention to provide an ice cream sandwich making apparatus that is capable of rapid and thorough cleaning and maintenance, by the provision of the primary stations of said wrapping machine in cantilevered fashion along a single support wall.

It is a further object of the present invention to provide an ice cream sandwich making apparatus as aforesaid that is of modular design and capable of the removal and retrofitting of the primary components concerned with the sandwich making process, to facilitate their replacement with like components of different size without the additional hassle of retiming the apparatus and using the pre-determined programs with the PLC and servo motors.

It is a still further object of the present invention to provide an ice cream sandwich making apparatus as aforesaid that is so designed as to render the removal and retrofitting of primary components rapid by the reduction in the number of screw fittings, support plates, chain drives, and sprockets that must be manipulated to such end.

It is a still further object of the present invention to provide an ice cream sandwich making apparatus having a friction member or press plate assembly to actively engage the ice cream sandwich while the pusher withdraws after pushing the ice cream sandwich on the conveyor surface. The friction member or press plate assembly can be further functionalized using a servo motor to adjust pressure depending on the size of the sandwich upon which friction is applied.

It is a further object of the present invention to provide a braking system coupled to said wrapping feeder means and communicatively coupled to said controller, wherein the braking system can have a sensor configured to monitor the tension of the wrap, and a braking means configured to apply torque to the wrap roller.

Other objects and advantages will become apparent to those skilled in the art from a review of the ensuing description which proceeds with reference to the following illustrative drawings.

BRIEF DESCRIPTION OF THE DRAWINGS

The features and advantages of this disclosure, and the manner of attaining them, will be more apparent and better understood by reference to the following descriptions of the disclosed system and process, taken in conjunction with the accompanying drawings, wherein.

DETAILED DESCRIPTION OF THE INVENTION

Figure 1A:
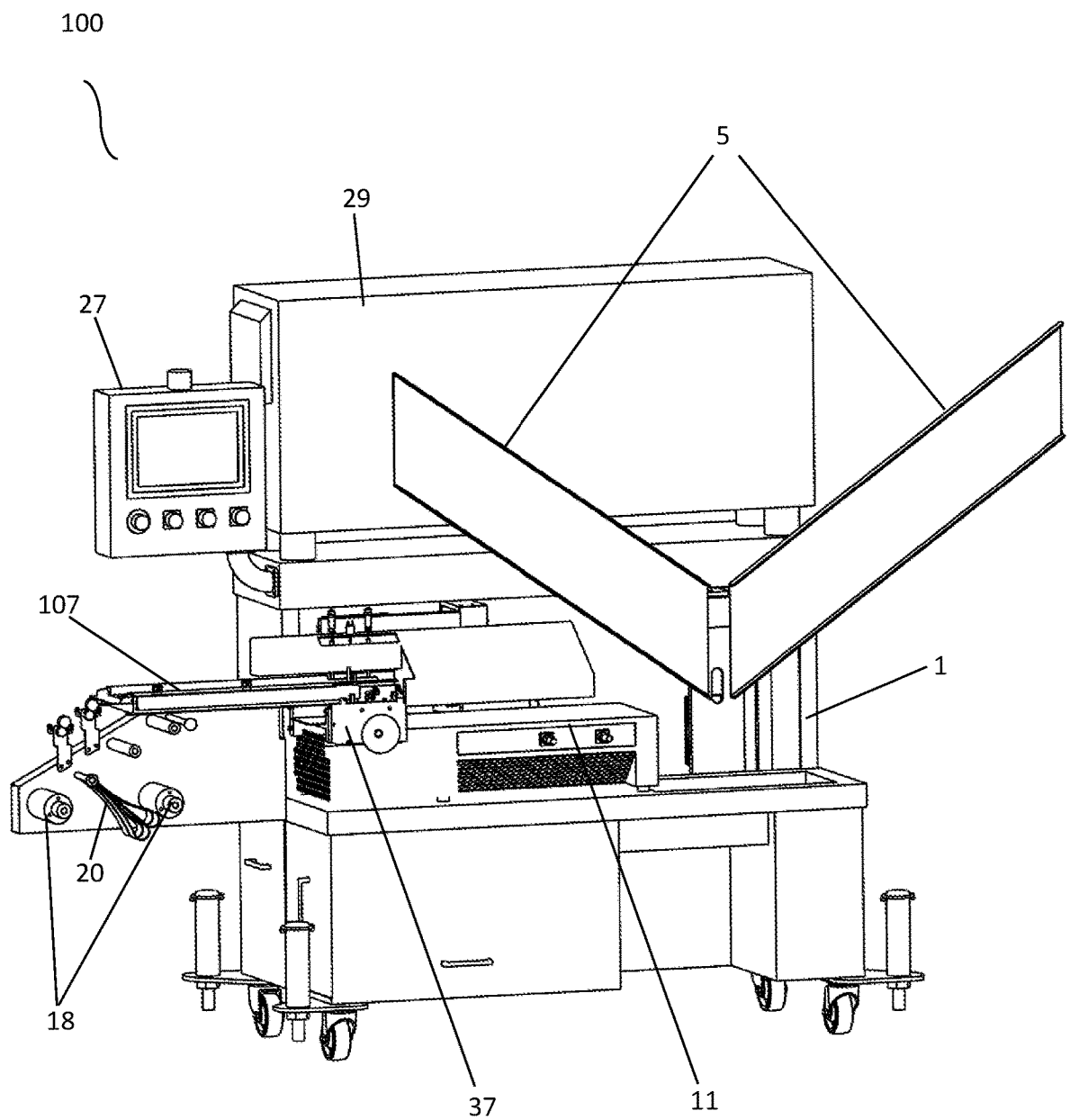
FIG. 1A is a front plan view of the apparatus of the present invention, setting forth components and parts thereof.

In its primary aspect, the present invention relates to an apparatus for the manufacture of comestible-containing sandwich sandwiches, such as ice cream products, which comprises a sandwich forming station including an extruder apparatus and wafer dispenser means associated lateral thereto, a means for receiving, indexing and conveying the formed sandwiches for packaging, a sandwich wrapping assembly and an output conveyor for the movement of wrapped sandwiches to an output end for further processing, packaging and shipping. Each of the stations of the apparatus of the present invention is mounted in cantilevered fashion against a vertical central support wall. Certain components thereof are individually removable and may be replaced with corresponding components of different size, to facilitate the operation of the apparatus of the invention in the manufacture of differently sized comestible sandwich products.

Referring now to FIG. 1A-B and FIG. 2A-B, ice cream sandwich apparatus 100 is disclosed which comprises a vertical support wall 1, to which are attached all of the primary components and stations of the said apparatus. Thus, apparatus 100 includes a sandwich assembling station comprising centrally located extruder nozzle 3, disposed centrally of wafer dispensing means 5. Wafer dispensing means 5 in turn comprises slanted wafer trays, disposed for communication with the output end or orifice of extruder nozzle 3. In addition, wafer hold-down bars are mounted above wafer trays, and in spaced relation thereto corresponding to the height of the wafers being dispensed for assembly of the sandwich product. Wafer hold-down bars and wafer trays, as well as the extruder nozzle, can all bolted to support wall 1, and in accordance with the present invention, are removable and replaceable with analogous components of different size.

A wafer pusher 7 is disposed with its parallel blades straddling an extruder nozzle 3. Wafer pusher 7 reciprocates in the vertical plane to urge wafers down into engagement with the extruded comestible to form the sandwich product. Wafer pusher 7 is likewise replaceable to accommodate differences in the size of the sandwich products being made.

The sandwich products thus formed may be vertically dropped and thereby delivered to the conveying means, comprising an indexing wheel 9. The indexing wheel 9, likewise removable in accordance with the present invention, comprises paired spaced apart circular disks, having pockets or notches regularly disposed about the circumference thereof, each pocket or notch sized and configured to receive a fully formed sandwich product. The indexing wheel 9, shown in FIG. 2A-B is configured to rotate, in this instance, in a counterclockwise fashion as depicted in FIG. 1, to deliver the formed sandwich products from the output of the extruder nozzle 3, to the horizontal conveyor 11. Horizontal conveyor 11 in turn is constructed so as to cooperate with indexing wheel 9 by means of fingers that are timed and positioned to engage the ice cream sandwiches as they are brought into the essentially horizontal position, and to remove them from the pockets of indexing wheel 9 and to urge them forward therealong.

Referring now to FIG. 2A-B, a conveyor 11 can be seen to define a central opened space within which indexing wheel 9 may rotatably pass. Indexing wheel 9 rotates about horizontal axis as shown, and may be aligned thereon by lock and key engagement with an axial rib located on axle mating with a corresponding slot in indexing wheel 9.

Referring further to FIG. 2A-B, a conveyor 11 can be disposed in cantilevered fashion and is thereby suspended along horizontally disposed axes of rotation, such as an axle, as shown. The conveyor is adjustable in width to accommodate different size of ice cream sandwich products. More particularly, sprockets 17 that are outboard and distal to the support wall are configured to move translationally along corresponding axles.

Figure 1B:
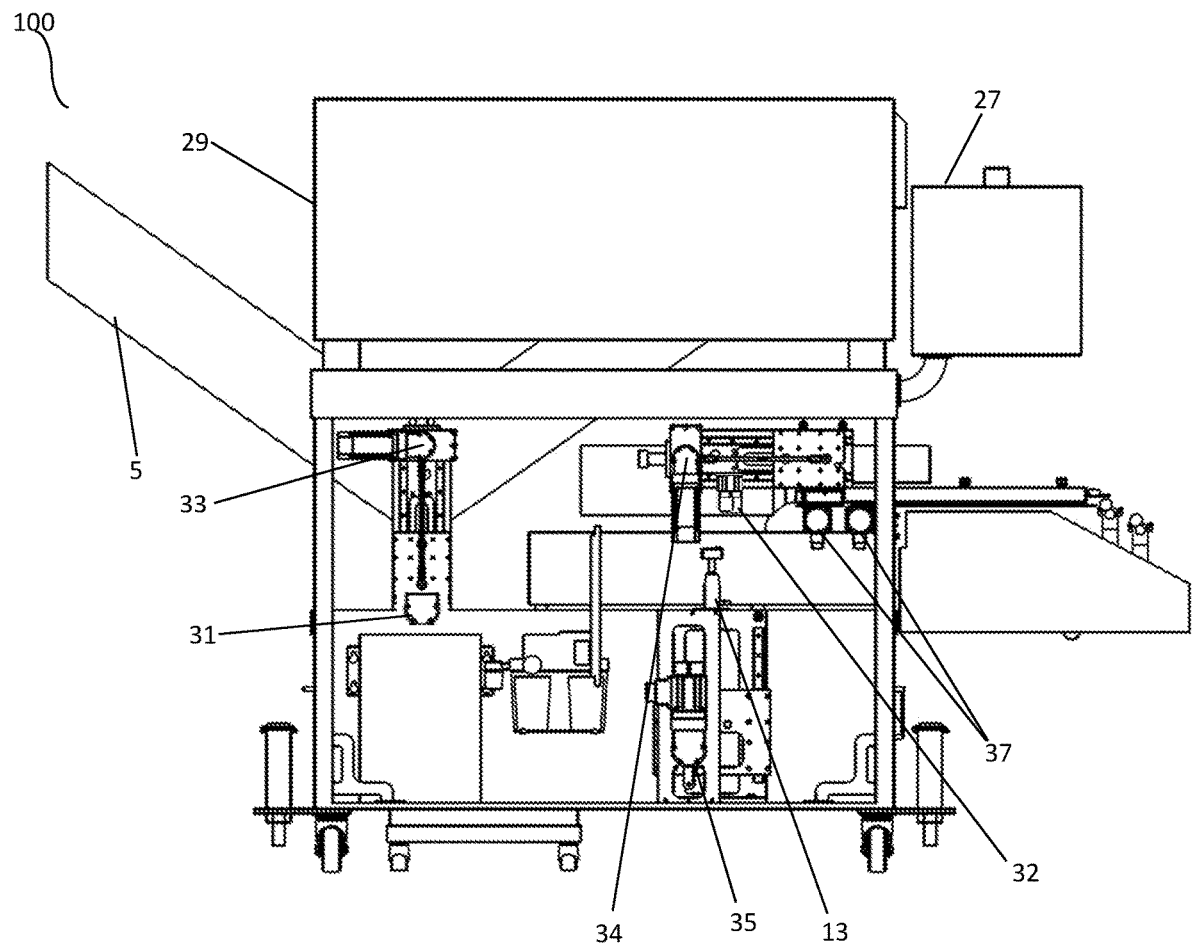
FIG. 1B is a rear plan view of the apparatus of the present invention, setting forth components and parts thereof.
Figure 2A:
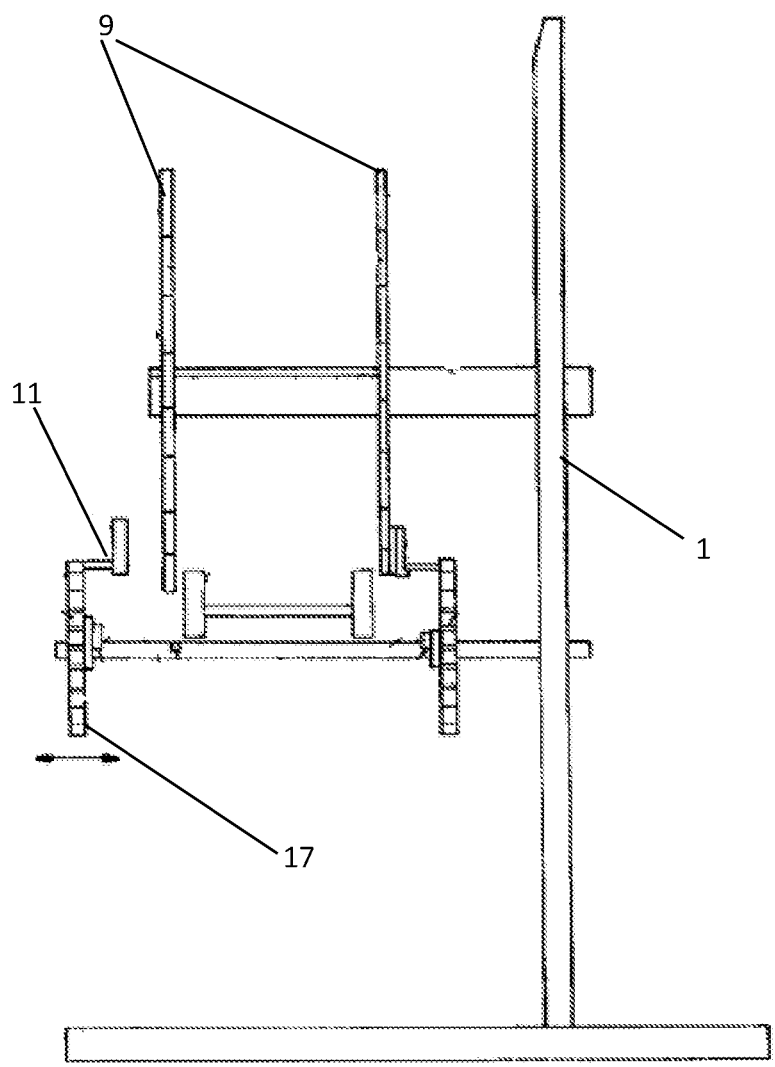
FIG. 2A is a side view of the apparatus of FIG. 1, depicting the cantilevered construction thereof and star wheel.
Figure 2B:
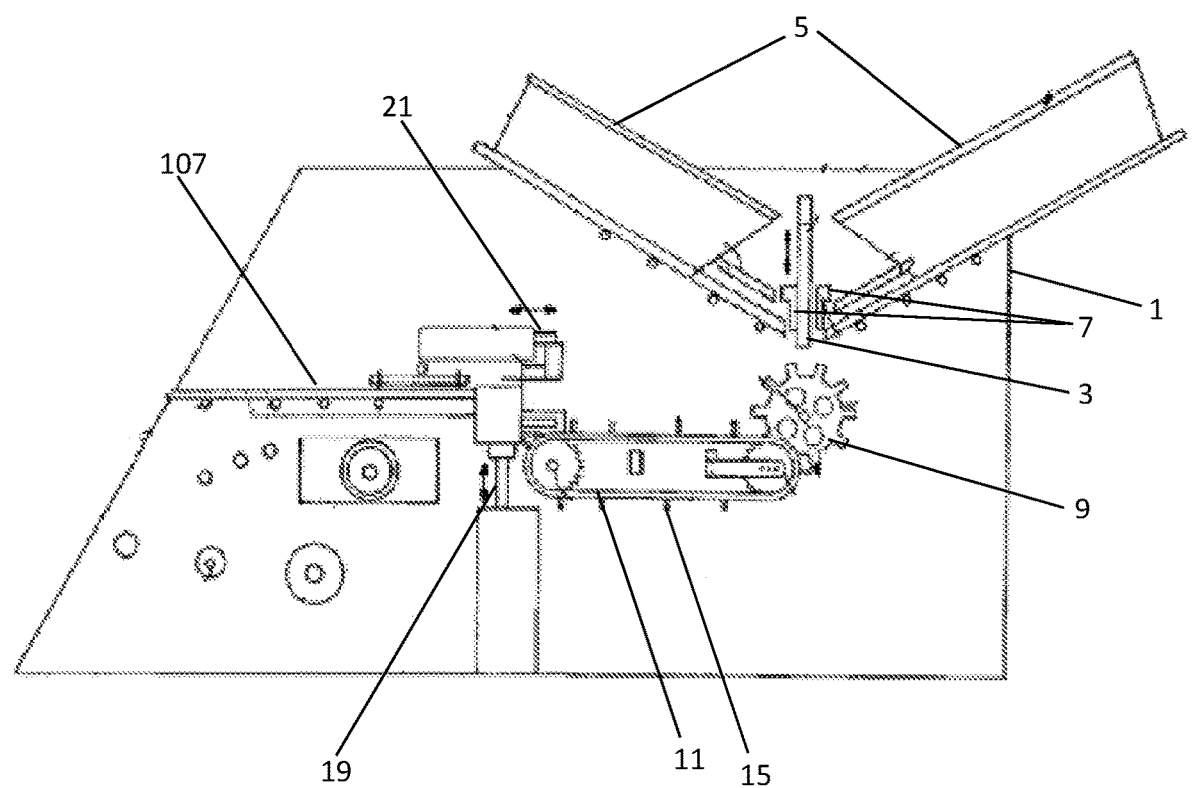
FIG. 2B is another exemplary view of the apparatus illustrating the star wheel and extruder.
Figure 3:
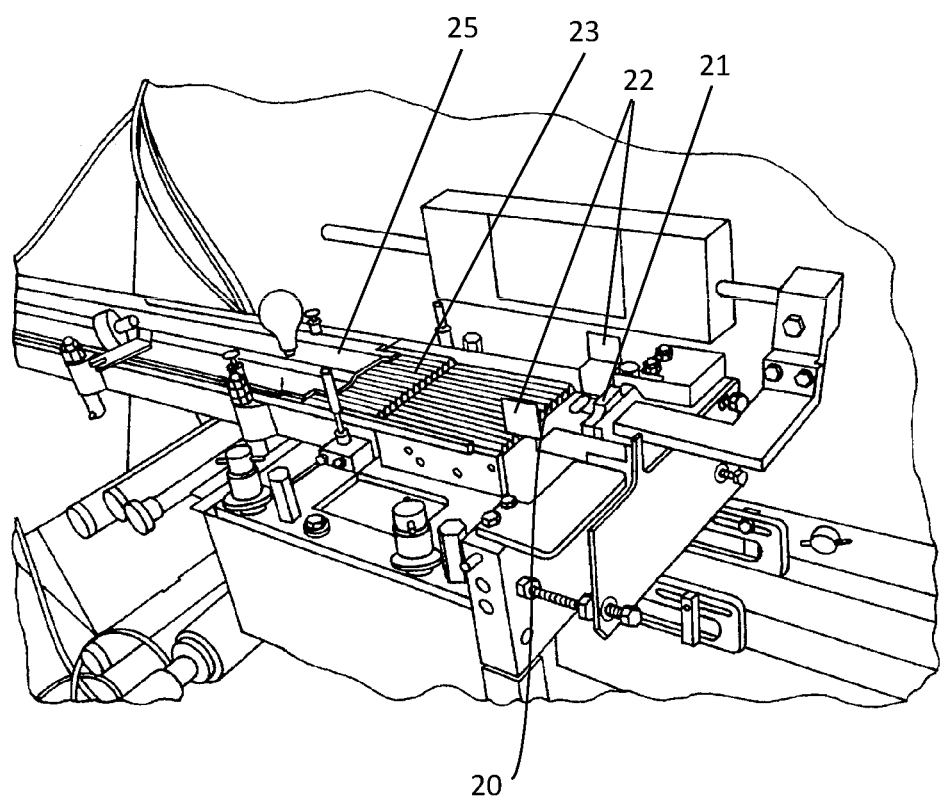
FIG. 3 is a left hand perspective view of an exemplary embodiment of the wrapping head section of the apparatus of the present invention showing the wrapping head, side tucker devices and pusher.

Referring generally to FIGS. 1A-B and 3, the apparatus includes a wrapping assembly, disposed at the output end of conveyor. The wrapping assembly includes a roller assembly 37 and wrapping head 20 defining an elevator shaft 19, which terminates at its uppermost end in a platform which cooperates with elevator means, side tucking fingers 22 and bottom tucking reciprocating pusher 21 to finally wrap and urge the finished sandwich product toward the output conveyor 107 and to the output end of the apparatus. The wrapping assembly can further be comprised of a press plate 25 and heat platen 23 to assist in wrapping the sandwich. Of these components, each is capable of removal and replacement with components of different size to accommodate corresponding differences in the ice cream products being wrapped. Wrapping paper spools 18 can be distal from the wrapping assembly and hold rolls of wrapping paper used to wrap the sandwich.

A further aspect of the present invention is the simplification of the actuation thereof, by means of using servo motors and drive units in connection with a controller that coordinates and connects to the drive units and servo motors to operate the components of the apparatus and receive feedback from the individual components of the apparatus. Specifically, the rear of apparatus is shown in FIG. 1B and is seen to comprise a vertical wall, to which is mounted to a plurality of servo motors to drive the individual stations and components of the apparatus. The drive units and controller are also shown being networked between each other. The human machine interface HMI and PLC can each have their separate housings, the HMI housing 27 and PLC housing 29. The servo motors can be connected to a drive unit or amplifier that can be controlled by a controller that provides overall control of the motion of each individual servo motor and the apparatus as a whole. The drive unit handles the power and speed control of the servo motor and can have brake control and temperature monitoring connections. The controller can also be connected to an HMI or graphical user interface to provide visual feedback and control to a use of the apparatus.

The controller can be a PLC or dedicated motion controller that provides commands to the drive units and which monitors sensors and limits inputs to ensure the apparatus is operating correctly and does not exceed the predefined program limits. The combination of the servo motors, drive units, and the controller form an encoder feedback loop that provides continual motor output shaft speed and position data, which can allow the drive unit to compensate for changes in load conditions that may affect the shaft speed and monitor the exact position of the shaft. Likewise, in some instances multiple components can be driven by one servo motor, such as the actuation for the elevator and the wrapping head can be achieved by the driving of both components from the same shaft of a servo motor.

FIG. 1B is an illustration of one exemplary embodiment showing various servo dives such as the indexing wheel servo assembly 31, the tucker drive servo assembly 32, the wafer pusher servo assembly 33, the bottom folding arm servo assembly 34, the elevator drive servo assembly 35, the wrapping roller drive servo assembly 37, the wrapping servo assembly 39, the conveyor servo assembly 41, and the wrapper paper dispensing servo assembly (not shown). The servo motors and assemblies are further illustrated in FIGS. 6-17 and discussed below.

Figure 4:
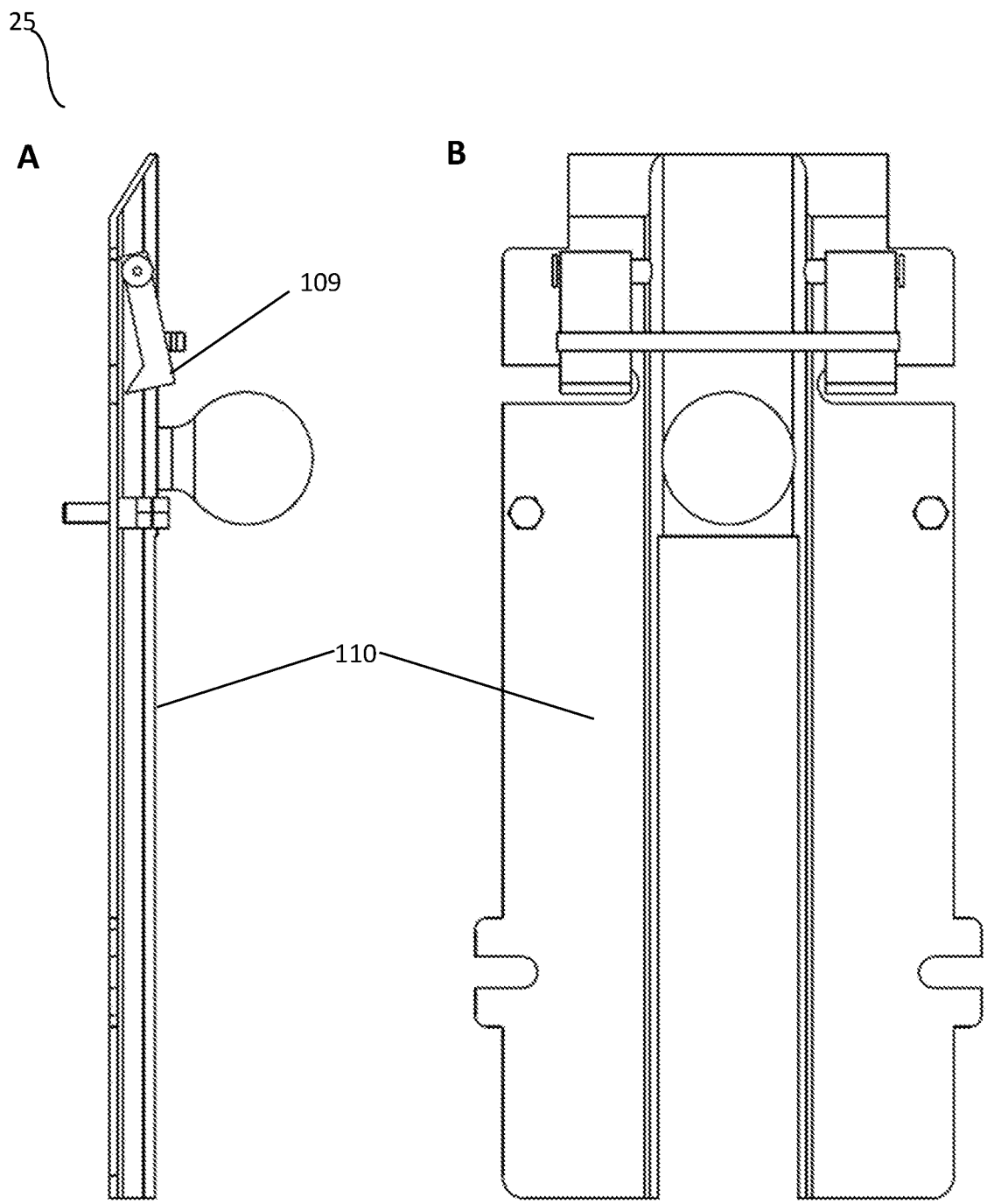
FIG. 4A is a side view of an exemplary embodiment of a component wrapping assembly showing the press plate assembly.
FIG. 4B is a top view of an exemplary embodiment of a component wrapping assembly showing the press plate assembly.

Referring further to FIG. 4A-B, a press plate assembly 25 can be used to engage the sandwich product while the pusher arm of the bottom folding arm assembly is withdrawing from the sandwich after pushing the sandwich on the conveyor surface. The press plate assembly 25 can include a top plate 110 and at least one pawl 109 or tang that engages the sandwich product to resist movement of the sandwich product in a direction opposite of the infeed direction while the pusher withdrawals. The top plate 110 that can go over the top and cover at least a portion of sandwiches as they are ejected from the wrapper head. Small delrin pawls can raise up when the sandwich is pushed forward and underneath the top plate 110 by the bottom fold pusher. When the sandwich is pushed past the delrin pawls 109, they drop down behind the sandwich. The bottom fold pusher then retracts and the delrin pawls 109 stop the sandwich from retracting along with the bottom fold pusher. This improvement allows for the use of different types of wraps for the sandwiches, i.e. Poly wraps.

Similarly, in an alternative embodiment, a friction member can be used to actively engage the ice cream sandwich while the pusher withdraws after pushing the ice cream sandwich onto the conveyor surface. The friction member may take other additional forms. In another embodiment of the present invention, a friction member can extend into the frictional path from the inner surface of one of the conveyor walls. In yet another embodiment of the present invention, a conveyor wall has an aperture, and a friction member is configured to extend through the aperture and into the frictional path of the sandwich product.

Referring further to FIG. 1A, after the folding of the wrapping material is completed, the sandwich can travel forward to the output conveyor 107. The output conveyer can comprise a slide or tray, on its way to the discharge end of the apparatus. The optional tray is adjustable in width like the conveyor, and the outboard end thereof may be reciprocated in relation to the wall to affect such adjustment. The output conveyer is further illustrated in FIG. 14.

Regardless of the embodiment of the friction member, the friction member may include a rubber member that is configured to engage the ice cream sandwich when the ice cream sandwich is in the conveyor position. Likewise, the friction member may include a toothed member that is configured to engage the ice cream sandwich when the ice cream sandwich is in the conveyor position. In another exemplary embodiment, the friction member may take the form of a plate that is mechanically driven by a servo motor to operate in connection with the pusher to apply enough pressure to the top of the sandwich to prevent it from moving after the pusher moves back in the opposite direction. The friction member can also be incorporated into the heat platen assembly, wherein the heat platen assembly comprises a heated platen that heat seals the wrapper while also securing the sandwich.

As indicated earlier, the sandwich making apparatus of the present invention is fully adjustable to accommodate differences in the size of sandwich products being prepared. As indicated above, certain of the components are capable of direct removal and replacement, such as, e.g., the wafer trays, pusher means, wafer hold-down bars, extruder nozzle and indexing wheel of the sandwich product assembly station, the conveyor rails of the conveyor means and the sandwich wrapping head and, in particular, the elevator, the sandwich wrapping platform, the side tucking fingers, the pusher means and the cut-off gears associated with the wrapping paper feed and cutting assembly. Certain other components of the apparatus are otherwise adjustable to accommodate differences in sandwich size, such as, e.g., the conveyor means and, in particular, the first chain type in the conveyor.

Particularly, the chain type conveyor as discussed above is capable of adjustment by the movement of the chain sprockets along their axes of rotation. Specifically and with reference to FIG. 2a, the sprocket 17 that is outboard and distal to supporting wall 1 may be moved and thereby adjusted inward in the direction of the supporting wall to reduce the lateral distance and thereby the width of the conveyor. The adjustment means for the sprocket may comprise moveable dogs that are screw adjusted. In another exemplary embodiment, a servo motor can be used to provide a simple adjustment which causes corresponding dogs 11, shown in FIG. 2, to move either away from or into engagement with a corresponding slot. An axle can define a plurality of slots for the reception of dogs 11, to accommodate a corresponding number of predetermined widths for the chain conveyor assembly.

In another exemplary embodiment the conveyor can be driven or powered by a servo motor wherein the drive shaft of the motor is coupled to a roller. This can eliminate the need for a chain and chain ring to drive the top rollers of the conveyor. A belt can be used in connection with at least two rollers located distally from each other. The rollers can be adjusted to apply tension on the belt that creates enough friction between the belt and the roller such that upon actuating the servo drive for the roller, the belt is driven smoothly with little to no slipping.

Figure 5A:
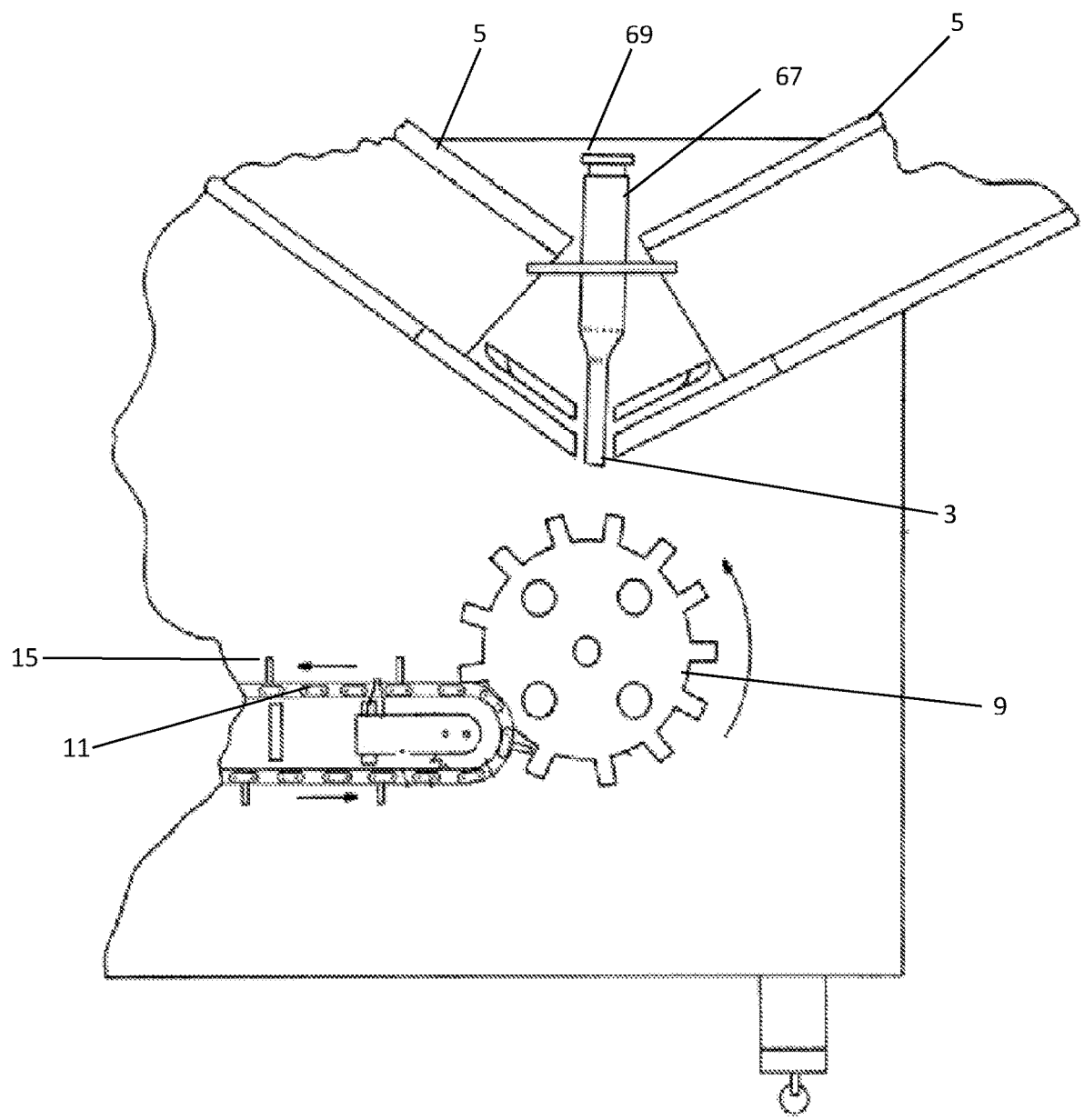
FIG. 5A is a front partial plan view of the apparatus of the present invention, illustrating the co-action of the indexing wheel and the conveyor, including the sprocket and chain.
Figure 5B:
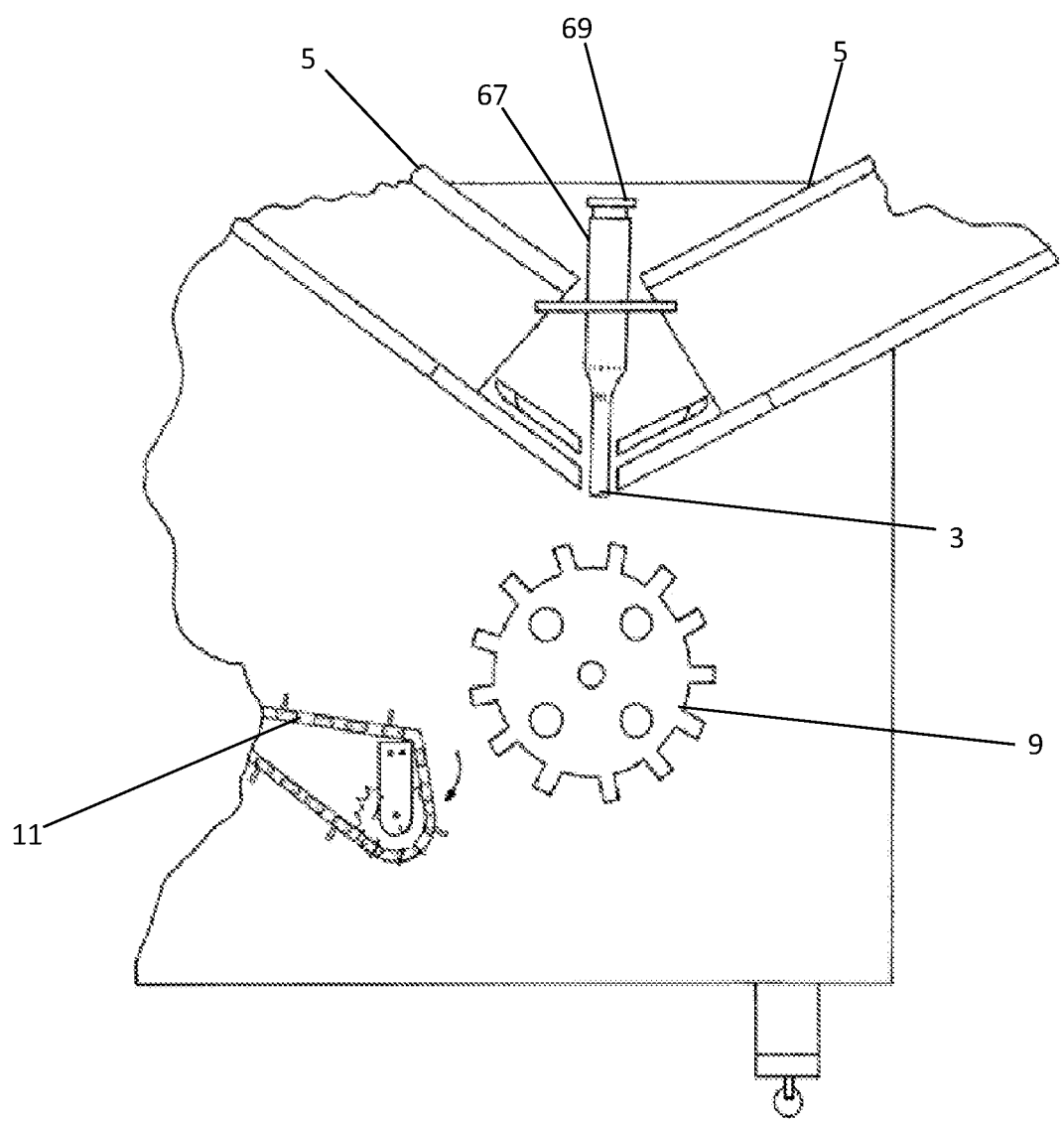
FIG. 5B is a partial fragmentary front view similar to FIG. 5A, illustrating the conveyor rotated downwardly and out of the way of the index wheel for removal of the latter.

Referring now to FIG. 5A, the conveyor can also provide a means for the pivoting movement of the end thereof positioned adjacent indexing wheel. Specifically, the infeed end of the chain is maintained on a support structure, which in turn is held secure to the remainder of conveyor by bolts or similar means of affixing. The support structure is capable of pivoting from the horizontal position in engagement with indexing wheel downward as illustrated in FIG. 5B, thereby out of the way of the indexing wheel during retrofitting of the apparatus to accommodate the manufacture of differently sized sandwich products. This pivoting function can be powered by an additional servo motor and assembly.

The output track that is disposed at the output end of the wrapping head or assembly is likewise laterally adjustable, and, like the conveyor, such adjustment is effected from the movement of the outboard edge of the conveyor. Referring again to FIG. 1A, the output conveyor 107 can define an outboard rail that may be adjusted by lateral movement inward along support rods. Thumb screw-type adjustments, not shown, are utilized, although it is to be understood that any suitable corresponding adjustable engagement means can be used as an alternative.

The apparatus of the present invention offers as part of its advantages ease of maintenance, by virtue of the reliance on a single vertical support wall for the mounting and maintenance of all operating components thereof. Unlike the equipment known in the art, the present apparatus does not require dual support from the lateral edges of the conveyor means, or from a second wall or like structure offering support to each of the rotating or translating components thereof. At most, the apparatus in use has an outer cover or structure about certain of the components thereof, such as the conveyor means, the wrapping head and wrapping assembly and the like, all of which may be easily removed for inspection and cleaning.

In operation, the comestible product is extruded and brought into contact with the corresponding wafers, is then delivered to the indexing means for delivery in turn to the first conveyor. The sandwich product thus disposed is delivered to the output end for the first conveyor for placement on the elevator of the wrapping assembly, where a quantity of wrapping material is disposed thereover and tucked and folded thereabout. Upon exiting the wrapping assembly, the sandwich is urged forward along the conveyor tracks for output to a packaging station.

In one preferred embodiment, the apparatus for making comestible-containing sandwich products can have a base with infeed end and a discharge end. The apparatus can have a sandwich product assembly station with an extruder nozzle mounted for discharge of a comestible filling material in the vertically downward direction. A pair of wafer trays for feeding wafers against opposite sides of the extruder nozzle is located with one tray on each side of the extruder nozzle. A vertically reciprocable wafer pusher driven by a first servo motor has a wafer pusher blade acting in combination with the wafer trays and extruder nozzle to urge wafers downward into contact with the comestible filling material.

In another aspect, the apparatus for making comestible-containing sandwich products can have a sandwich indexing member comprising an indexing wheel rotatably mounted and vertically below the sandwich product assembly station. The indexing wheel can have a plurality of circumferentially positioned pockets for receiving and transferring assembled sandwiches for conveyance toward the discharge end of the apparatus. The sandwich indexing member can be driven by a second servo motor.

A conveyor assembly can have an input end that extends from the indexing member and an output end proximal to the discharge end of the apparatus. The conveyor assembly can be driven by a third servo motor and comprise a movable conveyor for receiving the sandwiches from the indexing wheel and urging the sandwiches toward the discharge end. The conveyor can include a plurality of lugs of dogs projecting from the conveyor that are configured to cooperate with said indexing wheel to engage and urge said sandwiches out of the pockets, and the conveyor's track can be medially disposed in the conveyor.

A wrapping assembly is located at the output end of the movable conveyor. The wrapping assembly comprising a wrapping head having an upper platform. Additionally, the wrapping assembly has a shaft for the upward travel of a sandwich product to the platform that is uses an elevator member driven by a fourth servo motor for delivery of said sandwich product to the platform. A side tucking member is reciprocably mounted adjacent to the shaft wherein the side tucking member is driven by a fifth servo motor. Finally, a pusher bar, driven by a sixth servo motor can be reciprocably mounted adjacent to the platform that can urge the wrapped product off the elevator and toward the discharge end.

Additionally, an exit tray can be located at the discharge end and can include one or more heated platens. The heated platens can act to heat seal the bottom overlaps of the cut sheet of wrapping paper to each other, providing a secure wrap. A wrapping feeder means is included and can comprise a wrap roller driven by a seventh servo motor to feed a wrap to said wrapping assembly. The wrapping feeder can work in conjunction with a second roller that can be driven by an eighth servo motor.

Figure 6:
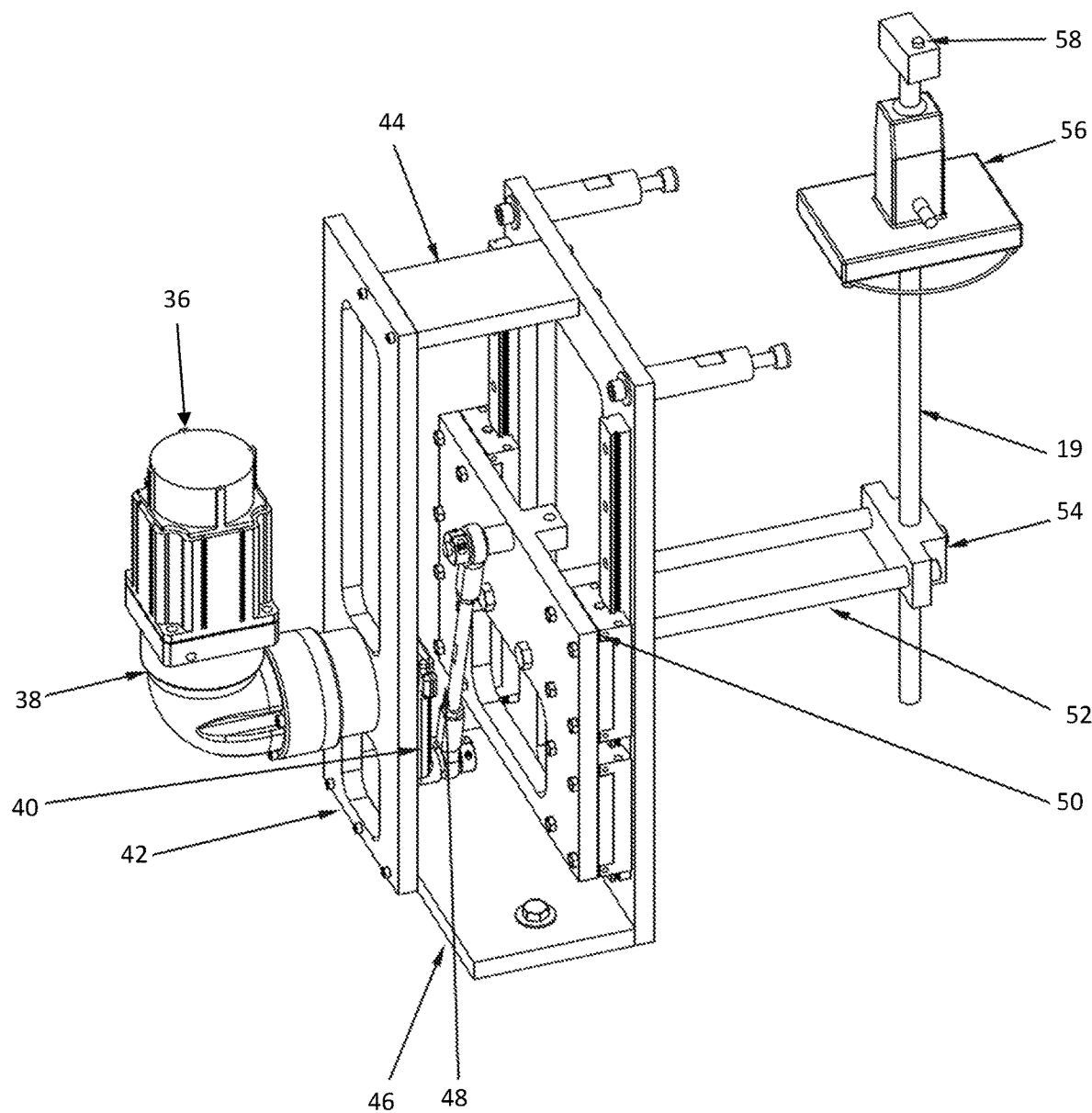
FIG. 6 is a perspective view of the servo motor drive for the elevator.

Referring now to more specific elements of the various assemblies that make up the apparatus, FIG. 6 illustrates an exemplary embodiment of the elevator drive servo assembly 35, having an elevator servo motor 36 coupled to a right angle gearbox 38. The right angle gearbox 38 can be coupled to the motor crank arm 40. The right angle gearbox 38 can be mounted on the elevator upright 42, which can be coupled to a top support 44 and base 46. The motor crank arm 40 can be coupled to the drive shaft 48, which can further be coupled to the carriage plate 50 that couples to the elevator shaft 19 via at least one tie shaft 52. A guide shaft mount 54 can be used to couple the tie shaft 52 to the elevator shaft 19. The elevator shaft housing 56 and the elevator platform 58 are located on the top end of the elevator shaft 19.

Figure 7:
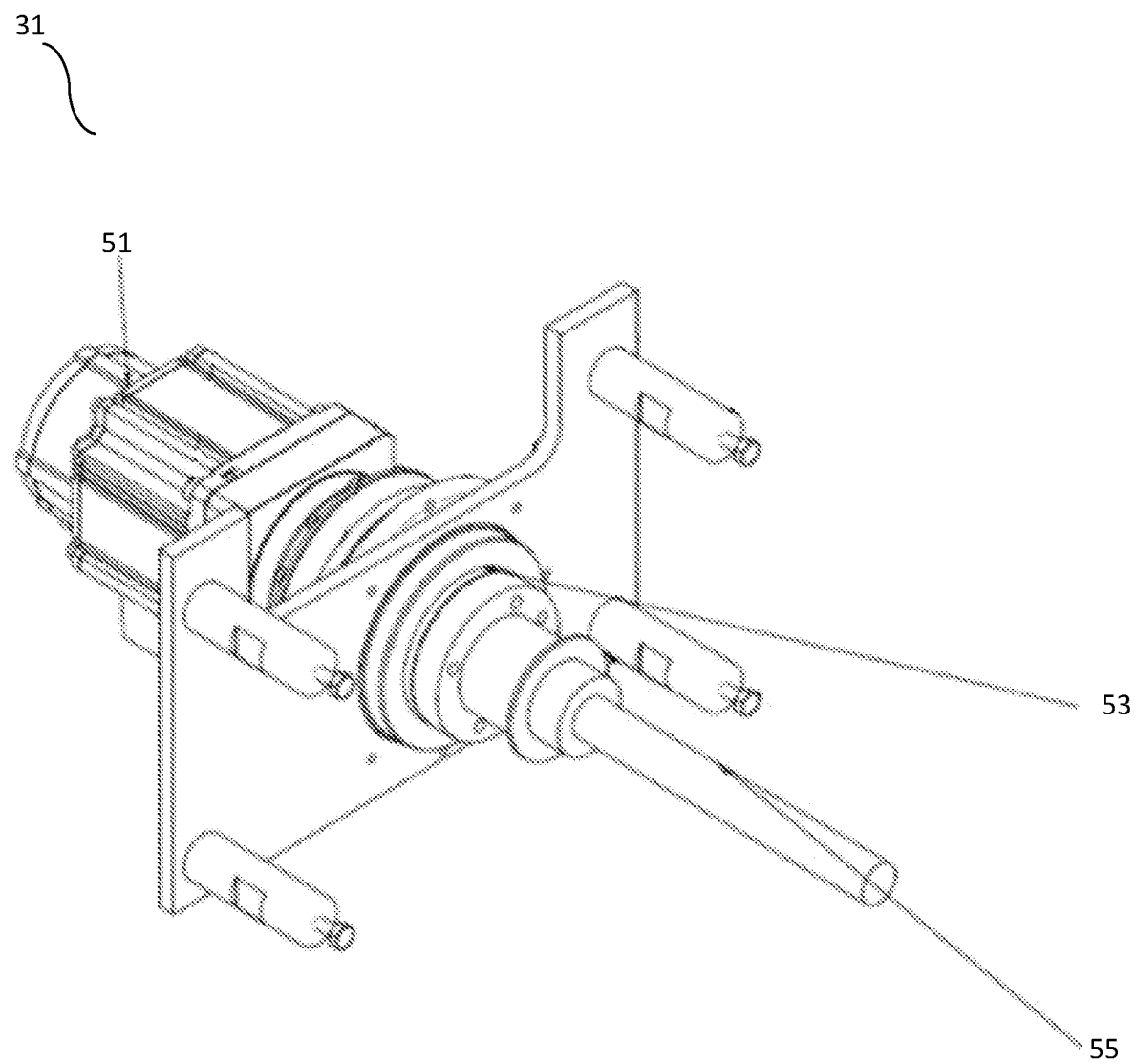
FIG. 7 is a perspective view of the servo motor drive for the index wheel assembly.
Figure 8:
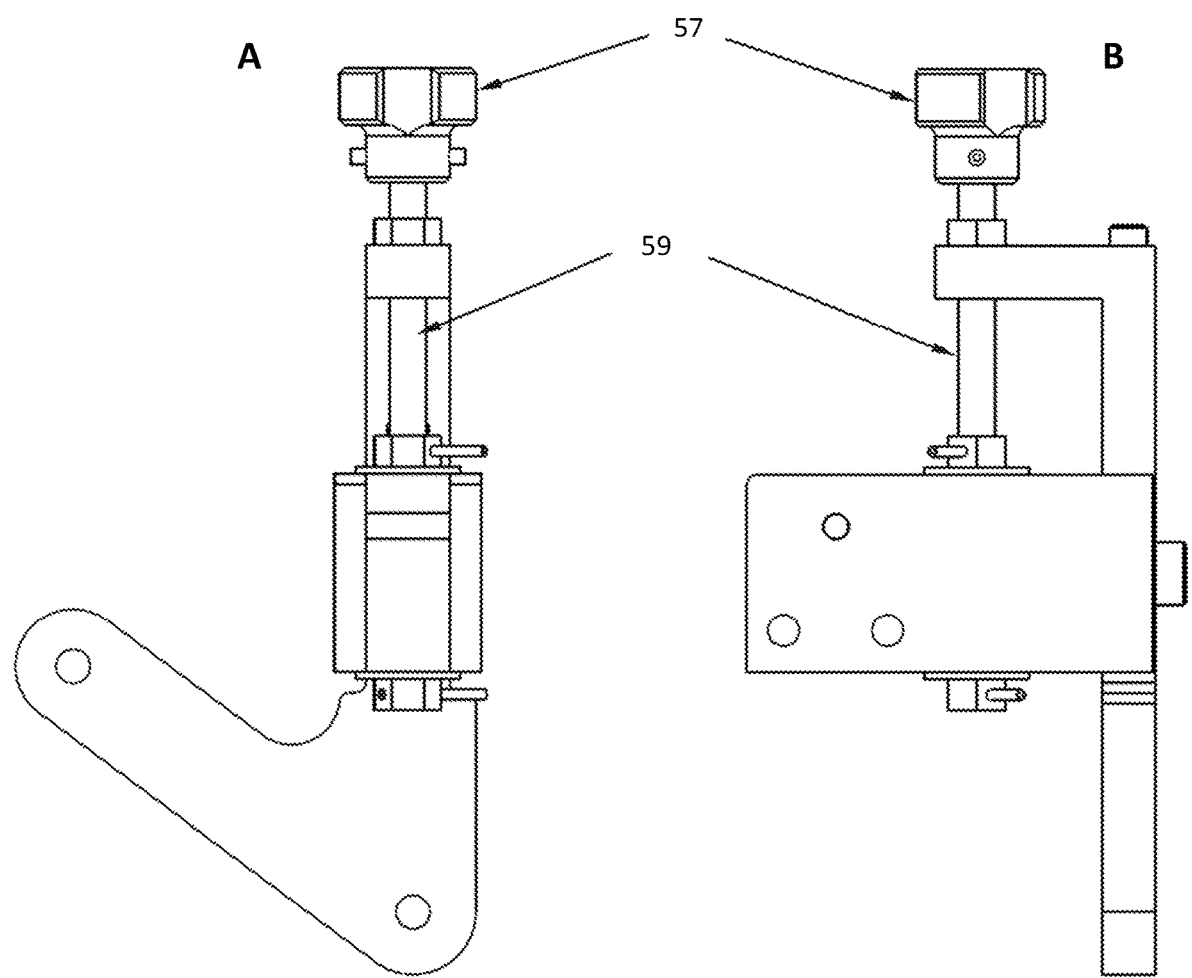
FIG. 8A is a front perspective view of the wafer break assembly.
FIG. 8B is a side perspective view of the wafer break assembly.

As illustrated in FIG. 7, the indexing wheel can be driven by the index wheel servo assembly 31. The index wheel servo assembly 31 can be powered by a servo motor 51 and drive a gearbox 53. The gearbox 53 is coupled to the index wheel shaft 55 to drive the indexing wheel. The PLC is communicatively coupled to the index wheel assembly servo 31 to control the speed of the index wheel in coordination with the other components of the apparatus.

Figure 9:
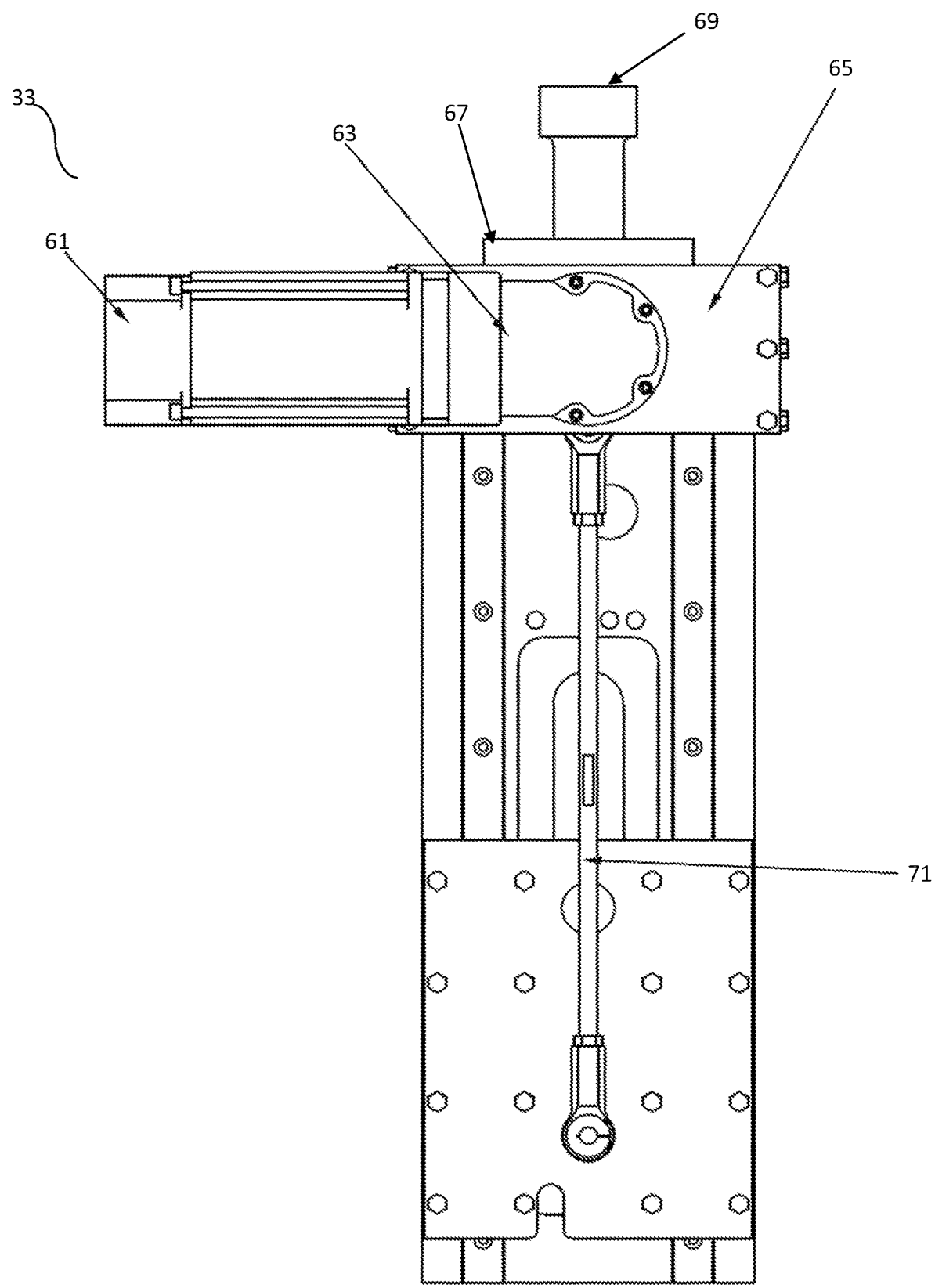
FIG. 9 is a perspective view of the servo motor drive for the wafer pusher assembly.

Referring to FIG. 8A-B, a wafer pusher 7 or wafer break assembly is shown. The wafer pusher can have a wafer adjuster knob 57 coupled to the wafer break adjustment screw 59. The wafer pusher 7 can be coupled to the wafer pusher servo assembly 33. Referring to FIG. 9, the wafer pusher servo assembly 33 can be comprised of wafer pusher servo 61 and a pusher gearbox 63, which is mounted to the servo motor mounting plate 65. The pusher gearbox 63 can be coupled to the drive shaft 71. The wafer pusher servo assembly can also include the extruder body 67 having an extruder adjuster knob 69.

Figure 10:
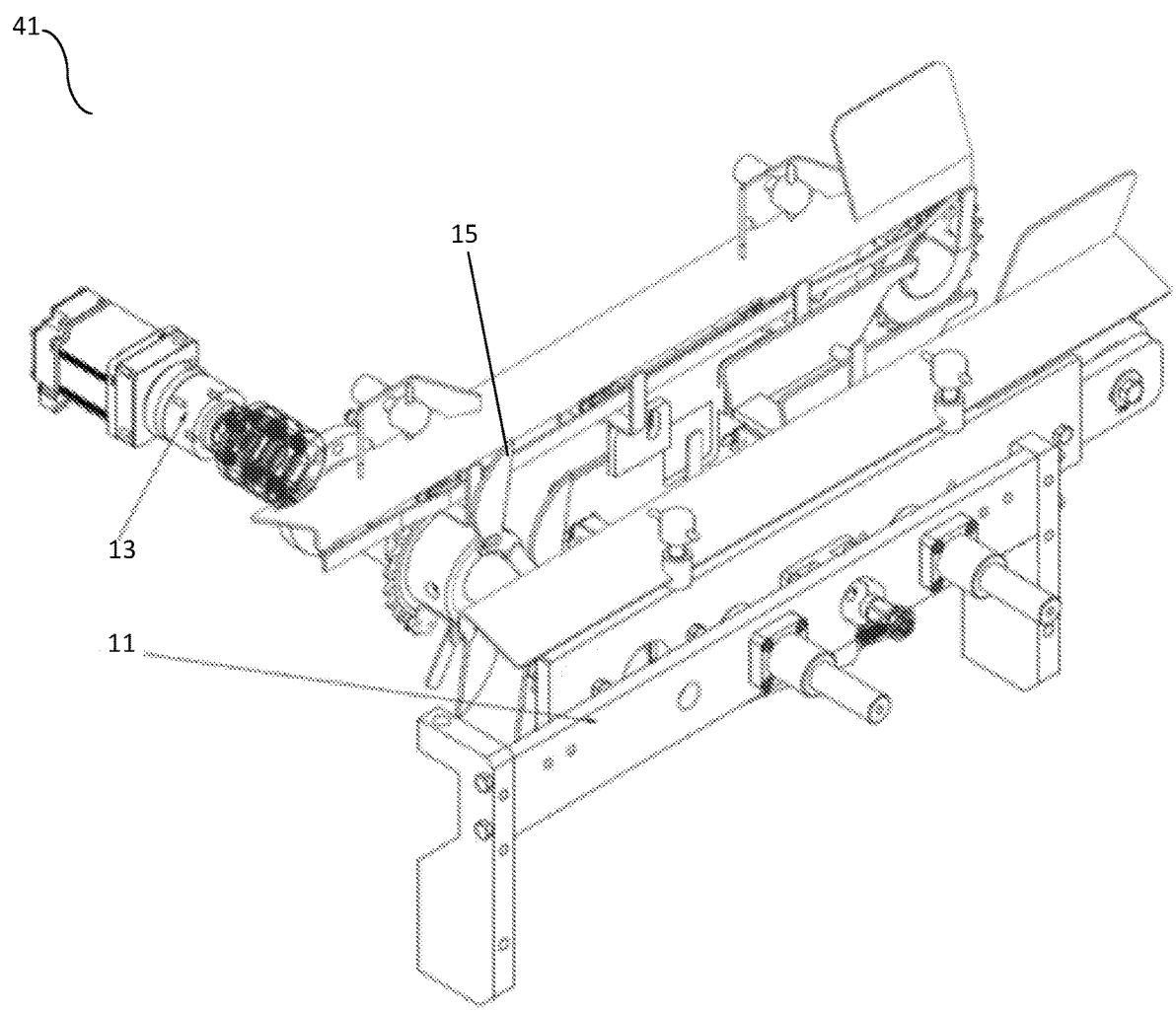
FIG. 10 is a perspective view of conveyor assembly and servo motor drive assembly for the conveyor.

FIG. 10 further illustrates one exemplary embodiment of a conveyor servo assembly. The conveyor can also include outer chains suspended along sprockets and driven by actuating means, such as a conveyor servo motor 13. Fingers disposed 15 on chains are, as indicated, regularly spaced and configured thereby to synchronously engage ice cream sandwiches for conveyance. The conveyor 11 also includes stationary conveyor track that are positioned medial of sprockets. Tracks support the sandwich products as they are urged forward along conveyor.

Figure 11:
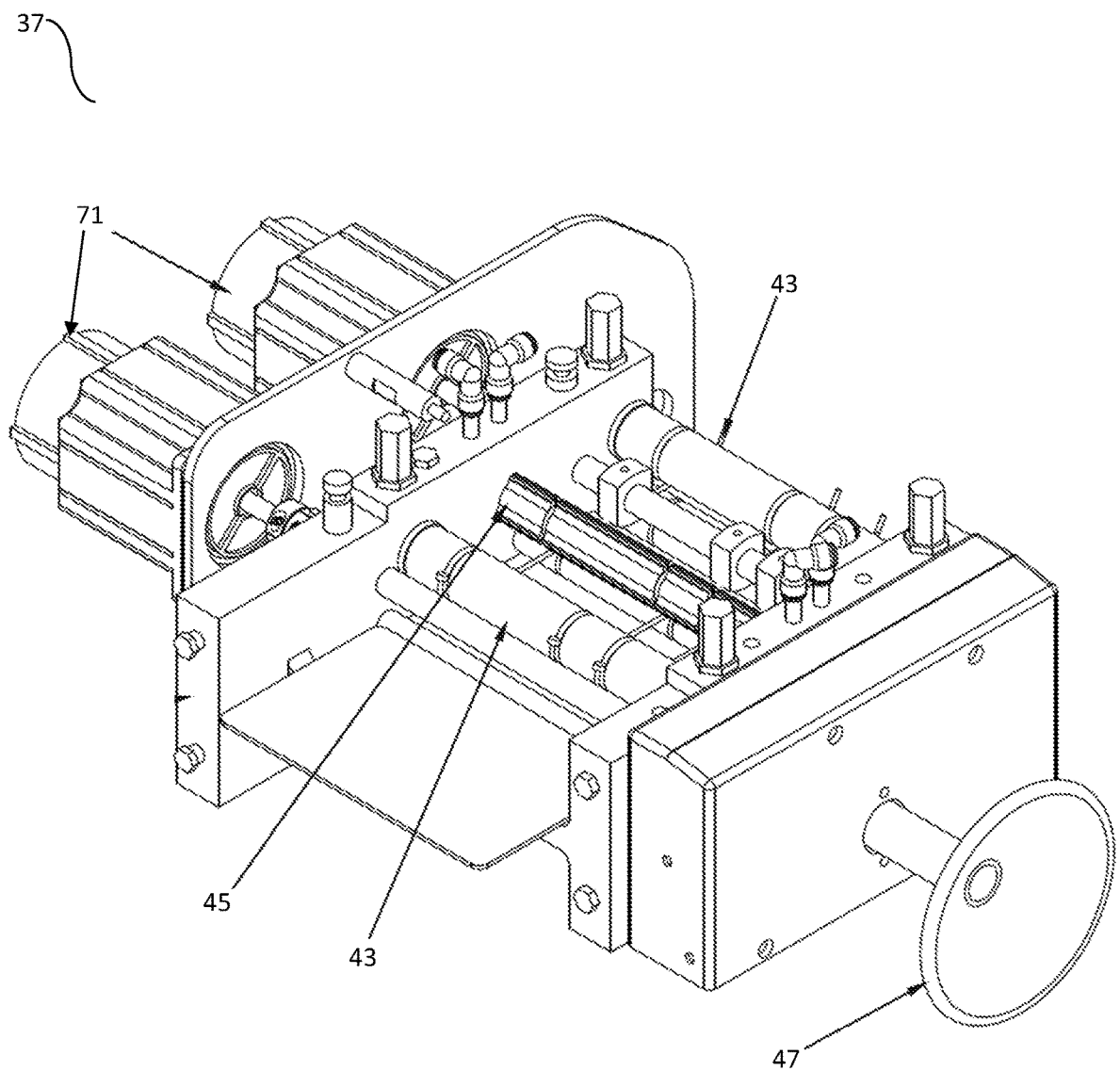
FIG. 11 is a perspective view of the servo motor drive for the roller assembly.
Figure 12:
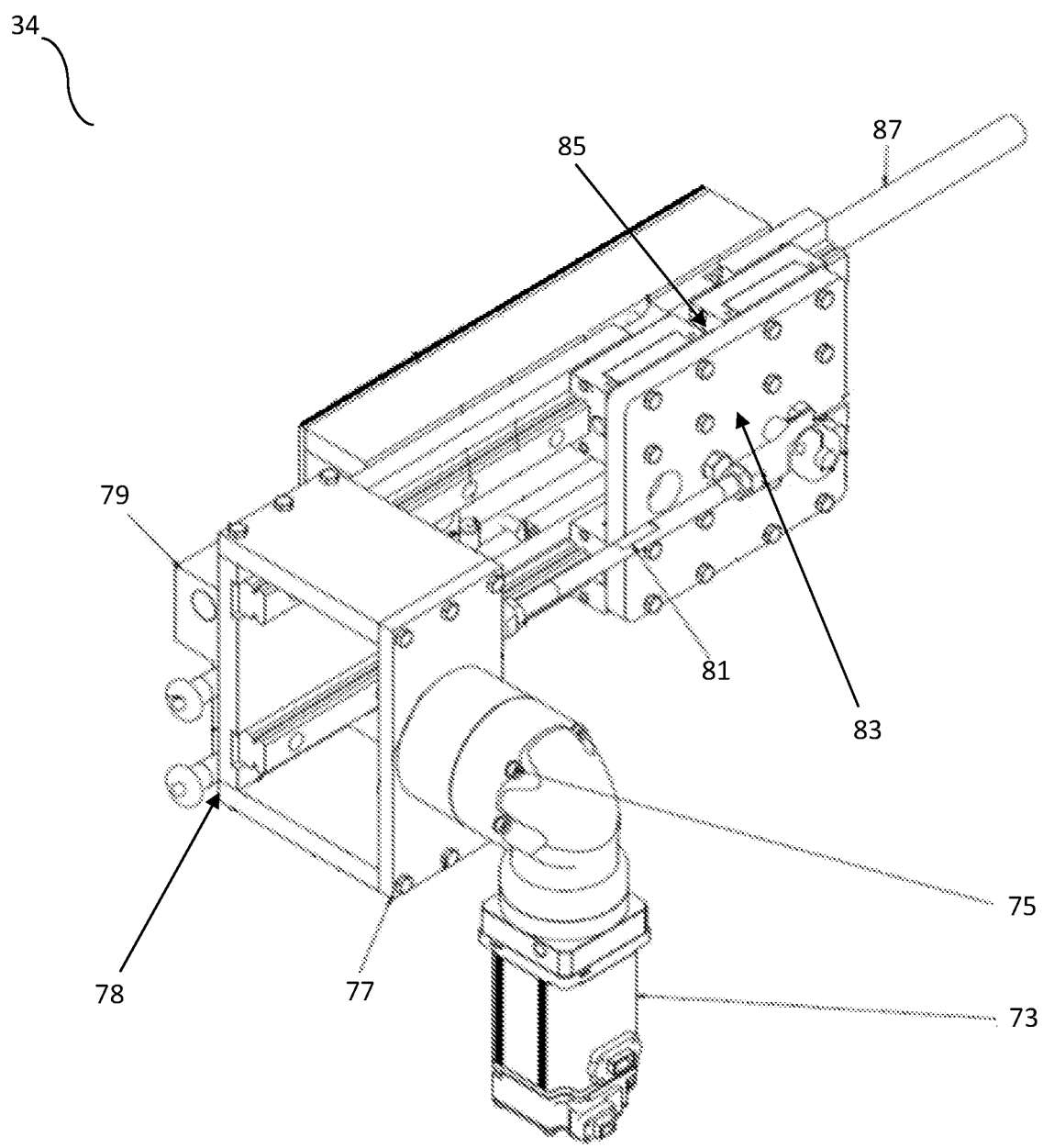
FIG. 12 is a perspective view of the servo motor drive for the bottom folding arm assembly.

As shown in FIG. 11, the wrapping roller drive servo assembly 37 can further include a wrapping feeder means, such as a roller assembly for the dispensing and delivery of wrapping material of predetermined size for disposition over the sandwich product as it is located on elevator. The wrapping feeder means can have a wrap roller that is driven by a servo motor to feed the wrap to the wrapping assembly. Thus, referring to FIG. 1, a payout reel dispenses wrapping material in sheet form, traverses pulleys, and is directed into the wrapping head area via wrapping feeder means. The wrapping material, not shown, is severed to size upon exiting the wrapping feeder means and is then disposed on top of the sandwich product which in turn rests on the elevator. As the elevator moves upward, the sandwich product passes through the elevator shaft not shown, until it reaches the platform.

In one exemplary embodiment of the present invention, the wrapping feeder means dispensing wrapping to the roller assembly having at least two rollers 43, a first roller and a second roller, and a rotary or roller knife 45 can be driven by two individual servo motors to provide greater control. In the two axis embodiment, shown in FIG. 11, the rotary knife and one of the rollers can be driven by a single servo motor and the second roller can be driven by a separate servo motor. The roller knife can be driven off of an idler gear from the second roller set at a fixed ratio, such as, e.g., about 2:1. The additional servo motors 71 can also reduce wear when advancing and or retarding the wrap tension. This provides greater reliability and reduces cost associated with the component wear and the downtime of the apparatus for maintenance. The roller assembly can also have a roller handle 47 to manually turn the roller when the assembly is not driven by the servos for any maintenance or service procedures.

In another exemplary embodiment, the wrapping roller drive servo assembly can have three axis wherein a separate individual servo motors are provided to drive each roller and a separate servo motor is provided to independently drive the roller. In the three axis embodiment of the wrapping roller drive servo assembly, three servo motors are provided. The first servo drives the first roller, the second servo drives the second roller, and the third servo can drive the roller/rotary knife. By eliminating the idler gear in the three axis embodiment there is much greater control of the second roller and the rotary knife.

The two axis embodiment requires the second roller set rotate between about 1.2 to about 2 times faster than the first roller set, depending on the paper cut length. The ratio is a direct result of having a fixed gear ratio between the roller and knife that dictated the speed to keep the knife synchronized. With the speed difference between the rollers, the first roller set may require more compression while the second roller set requires less. With previous roller dispensers, the first roller puts out the correct length of paper without slipping and the second rollers could slip against the wrap depending upon the type of wrap used.

Figure 13:
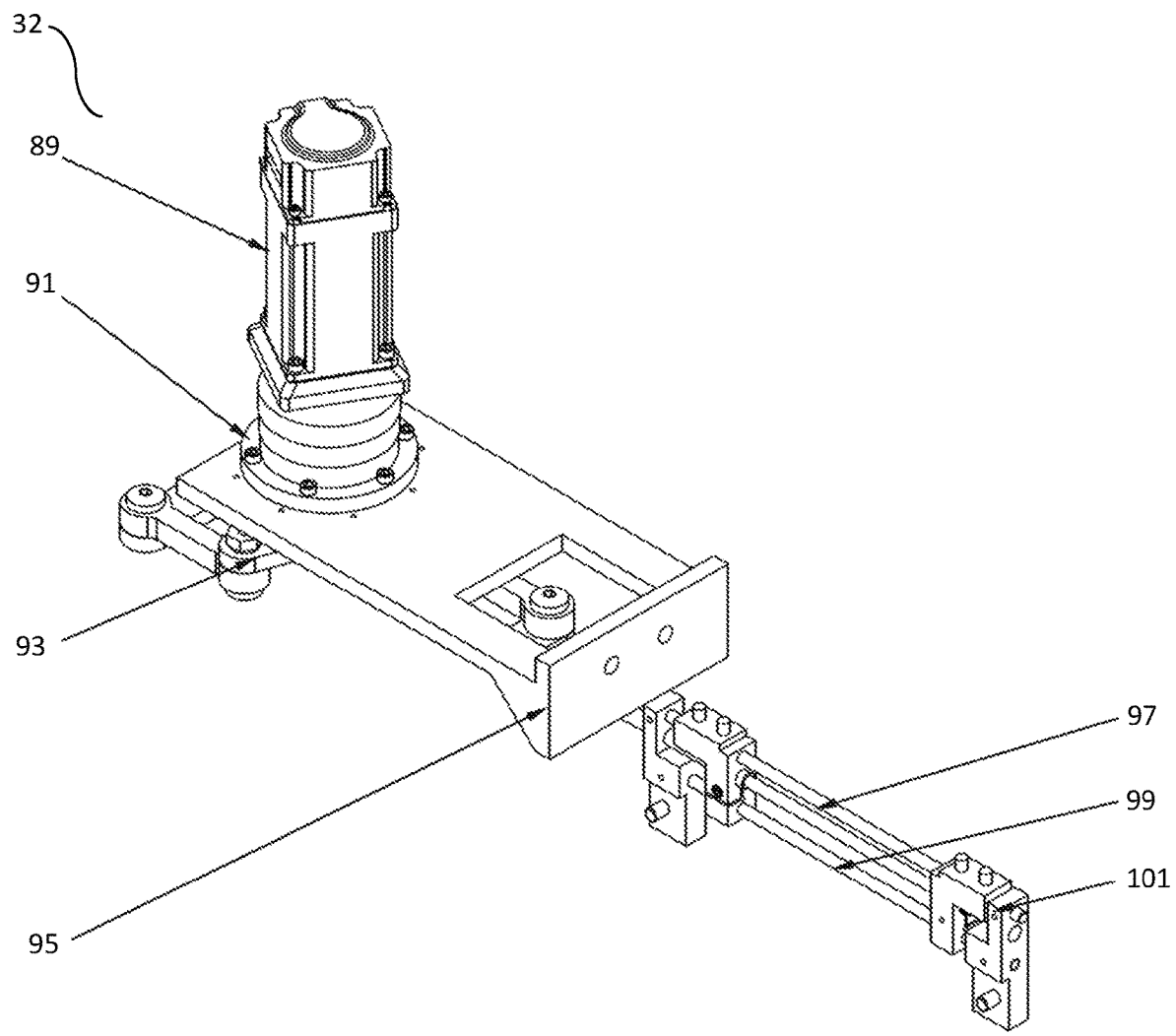
FIG. 13 is a perspective view of the servo motor drive for the tucker assembly.

The use of new types of wrap, such as poly wrap, have led to an increase in wear on the rubber rollers in the form of flat spots. This can be attributed to a combination of the rollers slipping against the poly wrap and the high rubber roller compression forces required for the poly wrap. The three axis setup can allow for a user to infinitely adjust the speed ratio between the first and second rollers. In one particular embodiment, the second roller set may be set to run at about 10% faster than the first set. In some embodiments, the second roller set needs to run slightly faster to aid the knife in cutting the paper. Running at this lower ratio, the compression force can be greatly reduced along with a reduction in the amount of slipping that may occur between the second roller and the wrap. In the configuration according to this embodiment, the ratio is no longer affected by the length of the paper because the knife is controlled separately. This provides for greater control over the roller assembly and its functionality along with greater reliability and reduced cost associated with the component wear and the downtime of the apparatus for maintenance. The bottom folding arm servo assembly 34, shown in FIG. 12 can be used to control the folding of the wrapper around the sandwich prior to reaching the output conveyor. The bottom folding arm servo assembly can comprise a folding arm servo motor 73 and a gearbox 75, where the gearbox 75 is mounted to a mounting plate 77. The mounting plate can be coupled to the slide block 78 and pusher arm bracket assembly 79. The motor 73 and gear box 75 can drive the guide rail 81, which is coupled to the connector block 83. The connector block can be coupled to a carriage block 85. The carriage block can further be couple to the bottom fold arm shaft or pusher shaft 87. The tucker drive servo assembly 32, as shown in FIG. 13 can then be used to assist with tucking the wrapper around the sandwich. The tucker drive servo assembly can have a tucker servo motor 89 coupled to a gearbox 91. The gearbox can be coupled to a tucker swivel rocker arm 93. The gearbox can be mounted on the tucker mount arm 95 that can be coupled to the wall 1. The swivel rocker arm can be coupled to an upper tucker shaft 97 and a lower tucker shaft 99, wherein both shafts are coupled to the tucker slide block 101.

Condensation can develop from the heat of the heated platen when sealing, which can lead to an impediment of the wrapped sandwiches when exiting the from the discharge end of the wrapping assembly. Similarly, the wrapper itself can have a certain coefficient of friction (COF) that can prevent the sandwich from exiting the discharge end. In one preferred embodiment illustrated in FIG. 14, the exit tray can be a roller tray that is configured to have a series of rollers designed to prevent wrapped sandwiches from sticking within the exit tray, thus preventing damage to the sandwiches and ensuring continuous operation of the apparatus. Similarly, the roller tray can comprise a continuous conveyor belt driven by a servo motor.

Figure 14:
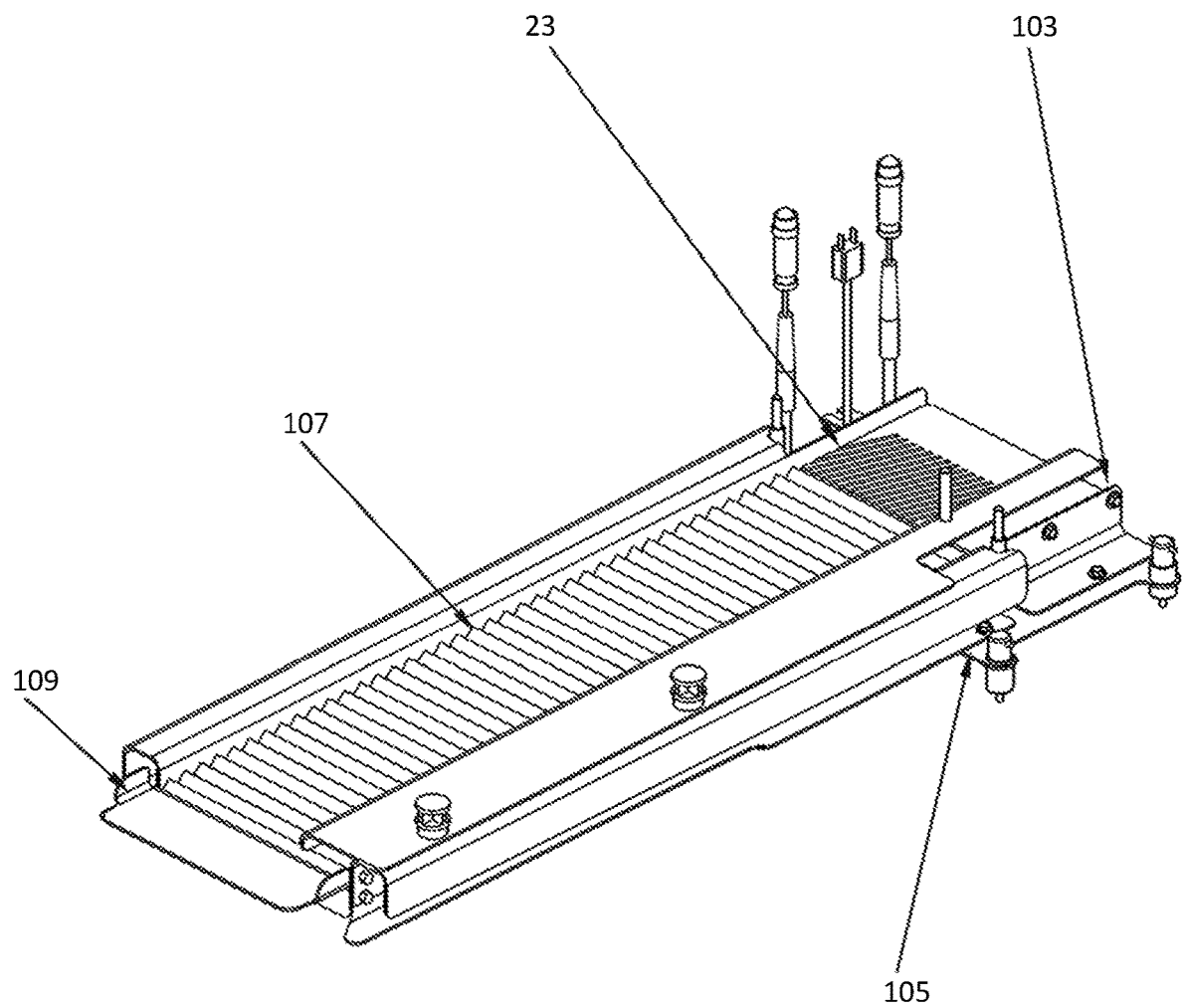
FIG. 14 is a perspective view of the discharge tray roller assembly.
Figure 15:
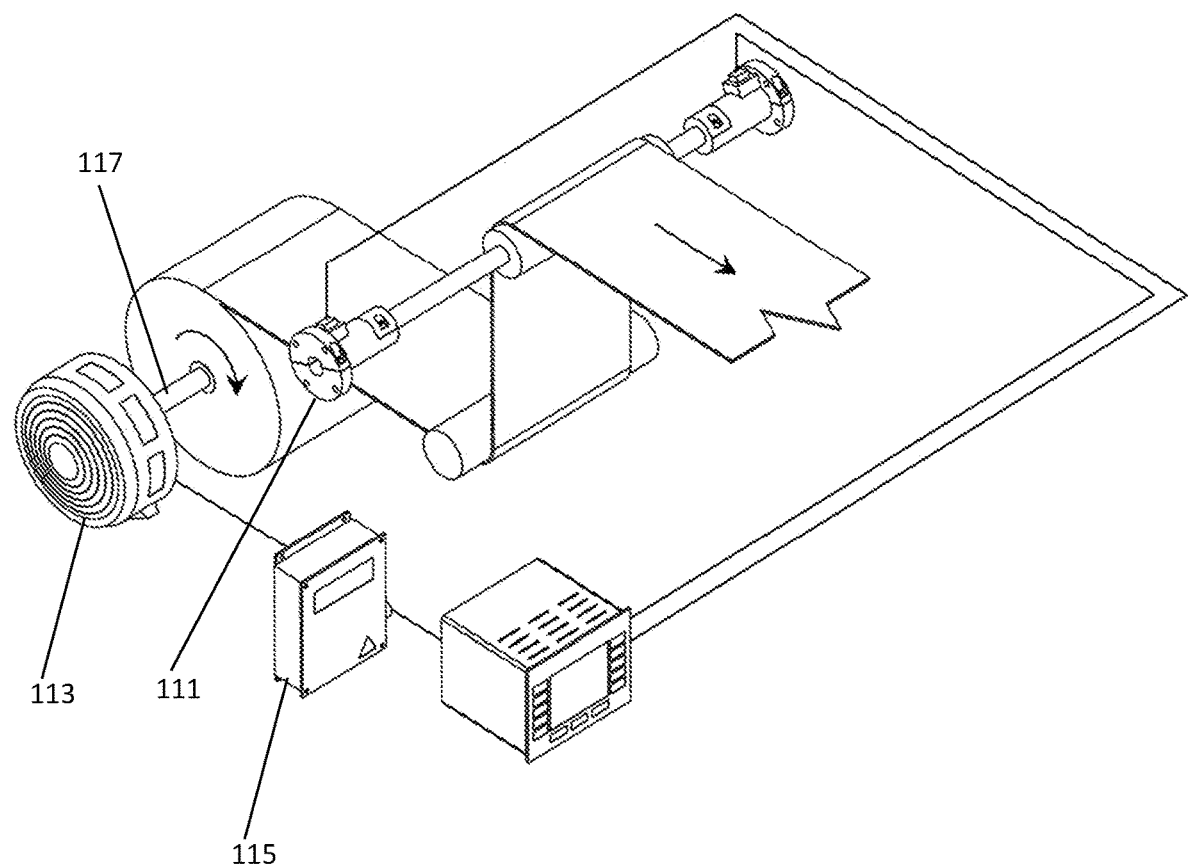
FIG. 15 is an illustration of a tensioning means having a braking means and load cell configured to provide a tension to a wrapping material.

As illustrated in FIG. 14, one exemplary embodiment of the output conveyor can have a heat platen 23 proximate to the discharge tray 103. The heat platen 23 and discharge tray 103 make up the heater block assembly 105. After the sandwich exits the heater block assembly it can travel down the roller tray or conveyor 107, and then exit at the discharge tray roller dead plate 109. As previously state, the output conveyor 107 can comprise a conveyor belt driven by a separate servo motor or can comprise a plurality of rollers the sandwich can passively roll down after being pushed of the heat platen 23.

In one exemplary embodiment, the rollers or the roller tray can also be driven by a servo motor or other mechanical drive. A single servo can drive multiple rollers where the rollers can use a belt drive or mechanically interlocked to allow for the movement of multiple rollers while only apply the servo to a drive roller, belt drive, or other suitable means.

Similarly, a tensioning means can be used with the wrapping feeder in the form of an additional servo motor or other component controlled by the PLC that can be used to adjust the tension of the wrap proximate to where the wrap unwinds. The tensioning means can be controlled by measuring or metering a load cell that sends corresponding load data to the PLC and human machine interface (HMI), which can communicate to the servo motor to control the unwind tension. Similarly, the tension can be applied to the roller using a braking system, such as a magnetic particle brake or disc braking system. The additional tensioning means can also incorporate sensor, such as a load cell or other suitable sensor, which provides feedback and data on the tension of the wrapping material. The sensor can trigger the PLC to adjust the tensioning means when a predetermined threshold is reached. In one exemplary embodiment of the present invention shown in FIG. 15, the load cell 111, a braking system 113, and PLC 115 are communicatively connected to allow the PLC to trigger a braking event upon receiving a signal from the load cell when a predetermined threshold is exceeded. The braking event can involve the braking system applying a braking pressure or torque to the roller 117.

Figure 16:
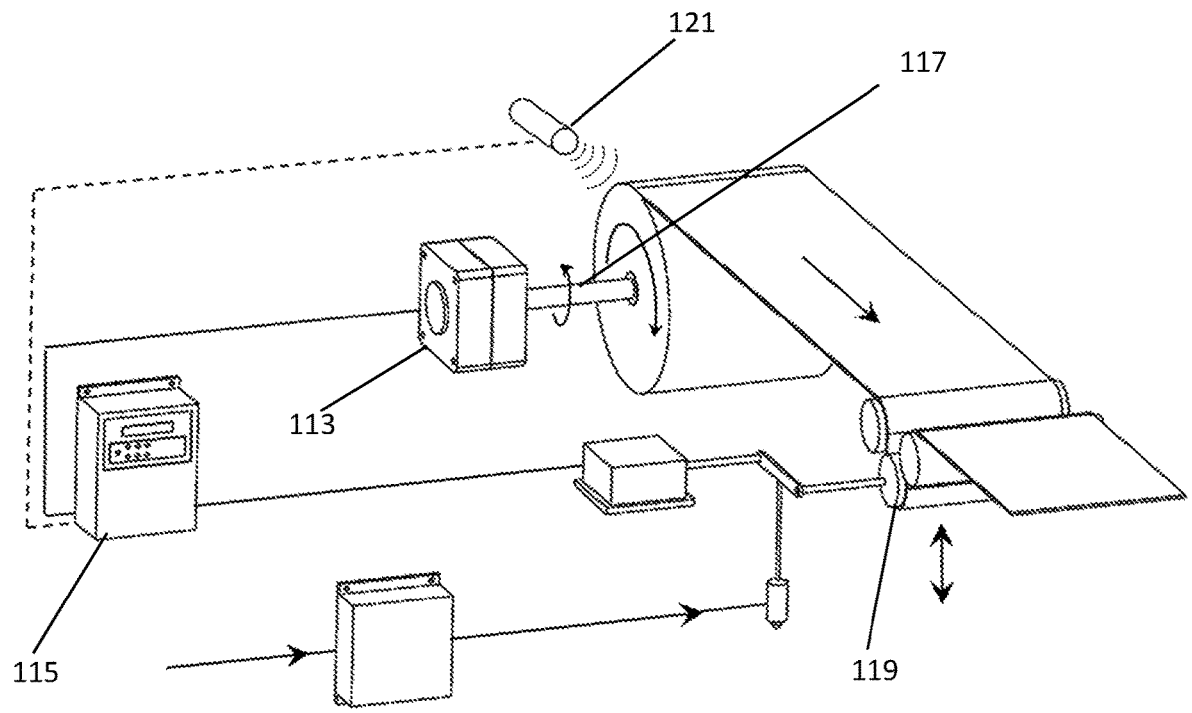
FIG. 16 is an illustration of tensioning systems have a braking means and dancer arm configured to provide a tension means to a wrapping material.
Figure 17:
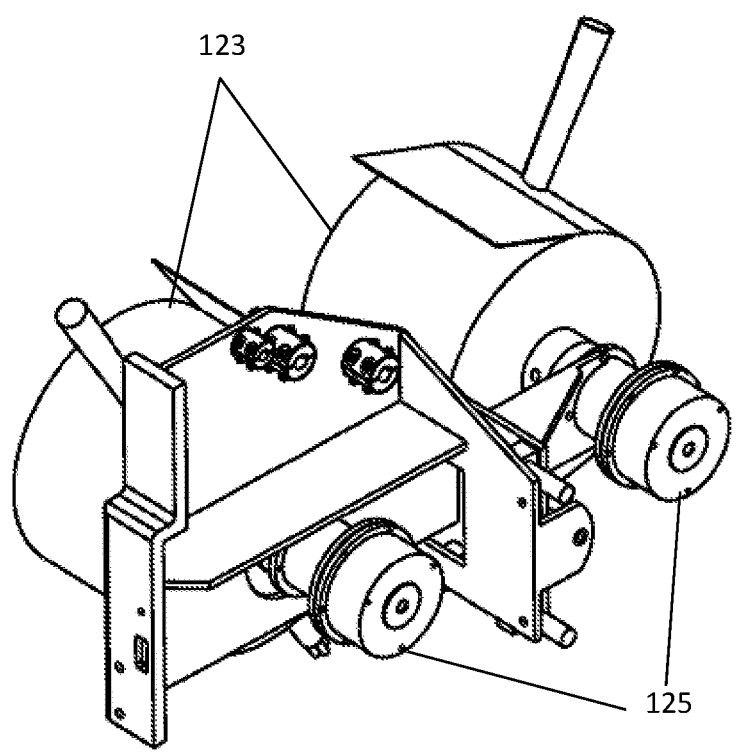
FIG. 17 is an illustration of a wrapping assembly configured to unwind a wrapping material.

Similarly, as illustrated in FIG. 16, a dancer arm 119 can be used in connection with the braking system 113 and PLC 115 to help control tension of the wrapping paper. A servo can be used to control or maintain the dancer arm 119 position. The dancer arm 119 can allow for increased accuracy in tension control, while also furthering the automation of the tensioning means by automatic control of the braking torque on the wrap roll, resulting in constant tension. Also, an ultrasonic sensor 121 that can be communicatively coupled to the PLC may be used to monitor the diameter of the wrap roll. The ultrasonic sensor can signal the PLC 115 to trigger a notification before the wrap roll becomes empty. Various other embodiments and combinations of the above embodiments can be used dependent upon the application needs. FIG. 17 further illustrates the dispensing means for the wrapping feeder, wherein two spools of wrapping paper can be hung on the apparatus and individual servo motors can be used to dispense or brake the spook in order to provide the appropriate tension to the paper as it is dispensed.

During the travel of the sandwich, the wrapping material is forced downward and into contact with the peripheral edges of the sandwich product. As previously described, laterally disposed side tucking fingers force the corresponding ends of the wrapping material between the bottom of the sandwich product and the top surface of the elevator. At the top of the cycle of the elevator, the sandwich product is in alignment without set conveyor, and is then urged forward by the motion of pusher means. An example of an assembly of a wrapping head and corresponding pusher element is schematically disclosed in U.S. Pat. No. 4,628,664 to Price, and such disclosure is incorporated herein by reference.

In accordance with the invention, the wrapping material feeder assembly is likewise adjustable by means of adjusting the speed of the servo motor powering the wrapping material feeder assembly. Because the servo motors can vary the operating speed of the assembly itself, including the rollers and other means for indexing and cutting the wrapping material, these components are not in need of direct replacement and the gears that would normally need to be switched out and indexed are also not in need of replacement. Such replacement would effect a corresponding change in the frequency of paper indexing and cutting to accommodate corresponding differences in product size.

A controller is communicatively connected to each servo motor and is configured to control the servo motors and timing of each servo motor relative to each other according to a pre-determined program. The controller can allow a user to manually slow down or speed up the program as determined by the user. Pre-determined programs can be entered into the controller to allow the apparatus to operate properly with various sized sandwiches. A graphical user interface can be connected to the controller to provide the user and easy operating interface.

The base of the apparatus has at least one vertical wall member. The sandwich product assembly station, the sandwich conveyor member, the sandwich wrapping assembly, the wrapping feeder, the conveyor, and the controller can all be mounted in cantilevered relationship on the base.

Having described specific preferred embodiments of the invention with reference to the accompanying drawings, it will be appreciated that the present invention is not limited to those specific embodiments, and that various changes and modifications can be effected therein by one of ordinary skill in the art without departing from the scope or spirit of the invention as defined by the appended claims.

What is claimed is:

1. An apparatus for the preparation of a sandwich product comprising:
    a base having an infeed end and a discharge end;
    a sandwich product assembly station comprising an extruder nozzle mounted for discharge of a comestible filling material in the vertically downward direction, paired wafer trays for feeding wafers against opposite sides of said extruder nozzle, and a vertically reciprocable wafer pusher driven by a first servo motor have a wafer pusher blade means cooperating therewith to urge wafers downward into contact with said comestible filling material;
    a sandwich indexing means comprising an indexing wheel rotatably mounted vertically below said sandwich product assembly station, said indexing wheel defining a plurality of circumferentially positioned pockets for receiving and transferring assembled sandwiches for conveyance toward said discharge end, wherein said sandwich indexing means is driven by a second servo motor;

a conveyor assembly having an input end extending from said indexing means and an output end proximal said discharge end, wherein said conveyor assembly is driven by a third servo motor, said conveyor assembly comprising:

a movable conveyor means for receiving said sandwiches from said indexing wheel and urging said sandwiches toward said discharge end, including a plurality of fingers projecting from said conveyor means and configured to cooperate with said indexing wheel to engage and urge said sandwiches out of said pockets, and a conveyor track means disposed medially of said conveyor means;

a wrapping assembly located at the output end of said movable conveyor means, said wrapping assembly comprising a wrapping head having an upper platform, a shaft for the upward travel of a sandwich product to said platform, an elevator means driven by a fourth servo motor for delivery of said sandwich product to said platform, side tucking fingers reciprocably mounted adjacent said shaft wherein said side tucking fingers is driven by a fifth servo motor, and pusher shaft reciprocably mounted adjacent said platform for urging the wrapped sandwich product off said elevator and toward said discharge end, wherein said push bar is driven by a sixth servo motor;

a wrapping feeder means, wherein said wrapping feeder means comprises a wrap roller driven by a seventh servo motor to feed a wrap to said wrapping assembly; and a controller communicatively connected to each servo motor configured to control the servo motors and timing of each servo motor relative to each other according to a pre-determined program, wherein said base comprises a vertical wall member, and wherein said sandwich product assembly station, said sandwich conveyor means, said sandwich wrapping assembly and said conveyor slide means are all mounted in cantilevered relationship on said base.

2. The apparatus of claim 1, further comprising a friction member adapted to extend into said frictional path and engage said sandwich product when said sandwich product is in said conveyor position, so as to resist movement of said sandwich product in a direction opposite said infeed direction.

3. The apparatus of claim 2, said friction member extends into said frictional path from the inner surface of one of the conveyor walls.

4. The apparatus of claim 2, wherein said friction member comprises a toothed member adapted to engage said sandwich product when said sandwich product is in said conveyor position.

5. The apparatus of claim 1, further comprising a wrapper press plate configured to engage said sandwich product when said sandwich product is in said conveyor position, so as to resist movement of said sandwich product in a direction opposite said infeed direction.

6. The apparatus of claim 1, further including an output conveyor extending from said upper platform toward said discharge end.

7. The apparatus of claim 1, further including at least one heated platen proximate to the discharge end, wherein said heated platen is configured to heat seal the bottom overlaps of the cut sheet of wrapping paper to each other and provide a secure wrap of said sandwich product.

8. The apparatus of claim 1, wherein said conveyor means for receiving said sandwich product is configured to be laterally adjustable to accommodate various sizes of sandwich product.

9. The apparatus of claim 2, wherein said friction member is a heated platen configured to heat seal the bottom overlaps of the cut sheet of wrapping paper to each other and provide a secure wrap of said sandwich product.

10. The apparatus of claim 1, further comprising a braking system coupled to said wrapping feeder means and communicatively coupled to said controller.

11. The apparatus of claim 10, wherein the braking system comprises:

a sensor configured to monitor the tension of said wrap, and a braking means configured to apply torque to said wrap roller.

12. The apparatus of claim 11, wherein said braking means is a magnetic particle brake.

13. The apparatus of claim 12, wherein said braking means is a pneumatic brake.

14. The apparatus of claim 12, wherein said breaking means is a servo motor.

15. The apparatus of claim 1, wherein said wrap roller servo drive assembly is further comprised of eighth and ninth servo motor configured, wherein the seventh and eighth servo are configured to drive a first and second roller to feed a wrap to said wrapping assembly, and wherein the ninth servo motor is configured to drive a rotary knife configured to cut said wrap.

16. An apparatus for the preparation of a sandwich product comprising:

a base having an infeed end and a discharge end;

a sandwich product assembly station comprising an extruder nozzle mounted for discharge of a comestible filling material in the vertically downward direction; paired wafer trays for feeding wafers against opposite sides of said extruder nozzle; a vertically reciprocable wafer pusher driven by a first servo motor have a wafer pusher blade means cooperating therewith to urge wafers downward into contact with said comestible filling material;

a sandwich indexing means comprising an indexing wheel rotatably mounted vertically below said sandwich product assembly station, said indexing wheel defining a plurality of circumferentially positioned pockets for receiving and transferring assembled sandwiches for conveyance toward said discharge end, wherein said sandwich indexing means is driven by a second servo motor;

a conveyor assembly having an input end extending from said indexing means and an output end proximal said discharge end, wherein said conveyor assembly is driven by a third servo motor, said conveyor assembly comprising:

a movable conveyor means for receiving said sandwiches from said indexing wheel and urging said sandwiches toward said discharge end, including a plurality of fingers projecting from said conveyor means and configured to cooperate with said indexing wheel to engage and urge said sandwiches out of said pockets, and a conveyor track means disposed medially of said conveyor means;

a wrapping assembly located at the output end of said movable conveyor means, said wrapping assembly comprising a wrapping head having an upper platform, a shaft for the upward travel of a sandwich product to said platform, an elevator means driven by a fourth servo motor for delivery of said sandwich product to said platform, side tucking fingers reciprocably mounted adjacent said shaft wherein said side tucking fingers are driven by a fifth servo motor, and pusher shaft reciprocably mounted adjacent said platform for urging the wrapped sandwich product off said elevator and toward said discharge end, wherein said push bar is driven by a sixth servo motor;

a wrapping feeder means, wherein said wrapping feeder means comprises a wrap roller assembly having a first roller, a second roller and a roller knife, wherein a seventh servo and an eighth servo are configured to drive the first and second rollers independently to feed a wrap to said wrapping assembly, and wherein a ninth servo motor is configured to drive a rotary knife configured to cut said wrap, a press plate assembly comprising a top plate and at least one pawl, wherein the sandwich is pushed forward and underneath the top plate and the top plate is configured to cover at least a portion of the sandwich, wherein said pawl is configured to raise up when the sandwich is pushed forward and underneath the top plate and then drop down behind the sandwich to resist movement of said sandwich product in a direction opposite said infeed direction when the push bar is withdrawn; and a controller communicatively connected to each servo motor configured to control the servo motors and timing of each servo motor relative to each other according to a pre-determined program, wherein said base comprises a vertical wall member, and wherein said sandwich product assembly station, said sandwich conveyor means, said sandwich wrapping assembly and said conveyor slide means are all mounted in cantilevered relationship on said base.

17. The apparatus of claim 16, further including at least one heated platen proximate to the discharge end, wherein said heated platen is configured to heat seal the bottom overlaps of the cut sheet of wrapping paper to each other and provide a secure wrap of said sandwich product.

18. The apparatus of claim 17, further comprising a braking system coupled to said wrapping feeder means and communicatively coupled to said controller.

19. The apparatus of claim 18, wherein the braking system comprises:

a sensor configured to monitor the tension of said wrap, and a braking means configured to apply torque to said wrap roller.

* * * * *